US012393160B2

(12) United States Patent
Furukawa

(10) Patent No.: US 12,393,160 B2
(45) Date of Patent: Aug. 19, 2025

(54) IMAGE FORMING APPARATUS

(71) Applicant: CANON KABUSHIKI KAISHA, Tokyo (JP)

(72) Inventor: Tetsuo Furukawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/666,772

(22) Filed: May 16, 2024

(65) Prior Publication Data

US 2024/0393742 A1 Nov. 28, 2024

(30) Foreign Application Priority Data

May 23, 2023 (JP) ................................. 2023-084481

(51) Int. Cl.
*G03G 15/00* (2006.01)
*G03G 21/16* (2006.01)
*G03G 21/18* (2006.01)

(52) U.S. Cl.
CPC ..... *G03G 21/1871* (2013.01); *G03G 21/1652* (2013.01); *G03G 21/1814* (2013.01); *G03G 21/1842* (2013.01)

(58) Field of Classification Search
CPC ........... G03G 21/1652; G03G 21/1814; G03G 21/1842; G03G 21/1871
USPC ....................................... 399/75, 88, 89, 111
See application file for complete search history.

(56) References Cited

U.S. PATENT DOCUMENTS

| | | | | |
|---|---|---|---|---|
| 6,201,935 | B1 * | 3/2001 | Terada | G03G 21/1892 399/13 |
| 7,248,810 | B2 * | 7/2007 | Miyabe | G03G 21/1871 399/90 |
| 2013/0022368 | A1 | 1/2013 | Takarada et al. | 399/110 |
| 2020/0183320 | A1 | 6/2020 | Nishiyama et al. | |

FOREIGN PATENT DOCUMENTS

| | | |
|---|---|---|
| JP | 2012-063750 | 3/2012 |
| JP | 2018-056006 | 4/2018 |
| JP | 2018-128697 | 8/2018 |

* cited by examiner

*Primary Examiner* — Hoan H Tran
(74) *Attorney, Agent, or Firm* — Venable LLP

(57) ABSTRACT

An image forming apparatus includes a unit including an electrical contact surface, and a main assembly which includes a contact member including first to fourth portions, and a contact portion, and a supporting member. A mounting and dismounting direction of the unit is a first direction. A direction crossing the first direction is a third direction. The supporting member includes an opposite wall opposing a side surface of the unit and being provided with an opening. The contact portion projects in the third direction through the opening toward an electrical contact surface side with respect to the opposite wall in the third direction. The contact member is provided so that the third and fourth portions are present on a side opposite from the electrical contact surface side with respect to the opposite wall. The fourth portion extends toward the third direction as viewed in the first direction.

17 Claims, 31 Drawing Sheets

(a)

(b)

(a)

(b)

(c)

(a)

(b)

(a)

(b)

(a)

(b)

IMAGE FORMING APPARATUS

FIELD OF THE INVENTION AND RELATED ART

The present invention relates to an image forming apparatus.

Conventionally, a constitution in which members (process members), including a photosensitive drum and the like, used for image formation are collectively assembled into a cartridge made detachably mountable to an apparatus main assembly of the image forming apparatus has been known. Such a cartridge is constituted so that a main assembly-side electrode member provided in the apparatus main assembly and a cartridge-side electrode member contact each other and thus the process members and the apparatus main assembly are electrically connected to each other in a state in which the cartridge is mounted to the apparatus main assembly. Here, for example, in Japanese Laid-Open Patent Application No. 2012-063750, as an example of the cartridge-side electrode, a constitution in which an electroconductive resin is injected into a frame constituting the cartridge is disclosed. On the other hand, as the main assembly-side electrode member, a wire spring including a torsion coil portion is used in some cases. The wire spring projects toward the cartridge-side electrode member through a hole provided in an opposite wall opposing a side surface of the cartridge, and contacts the cartridge-side electrode member when the cartridge is mounted.

SUMMARY OF THE INVENTION

According to an aspect of the present invention, there is provided an image forming apparatus comprising: a unit including an electrical contact surface and a power receiving member configured to receive supply of electric power via the electric contact surface; and a main assembly to which the unit is detachably mounted, the main assembly including a contact member configured to supply the electric power to the power receiving member in contact with the electrical contact surface of the unit, the contact member being a wire spring including a coil portion and an arm portion which extends from the coil portion and which has a free end, wherein the arm portion includes a first portion, a contact portion, a second portion, a third portion, and a fourth portion in a named order between the coil portion and the free end, wherein the main assembly includes a supporting member provided with a supporting portion for supporting the coil portion, wherein when a mounting and dismounting direction of the unit is a first direction, a direction which is a direction of a center axis of the coil portion and which crosses the first direction is a second direction, and a direction crossing the first direction and the second direction is a third direction, the first portion, the contact portion, and the second portion are arranged along the first direction, the contact portion is configured to contact the electrical contact surface, the first portion extends so as to approach the electrical contact surface as the first portion approaches the contact portion from the coil portion in the first direction, the second portion extends away from the electrical contact surface as the second portion extends from the contact portion in the first direction toward a direction away from the first portion, and the third portion extends toward the second direction, wherein the supporting member includes an opposite wall which opposes a side surface of the unit provided with the electrical contact surface and which is provided with an opening extending in the first direction, wherein the contact portion projects in the third direction through the opening toward a side where the electrical contact surface is present with respect to the opposite wall, wherein the contact member is provided so that the third portion and the fourth portion are present on a side opposite from the side where the electrical contact surface is present with respect to the opposite wall, and wherein the fourth portion of the contact member extends in the third direction as viewed toward the first direction.

Further features of the present invention will become apparent from the following description of exemplary embodiments with reference to the attached drawings.

Figure 2:
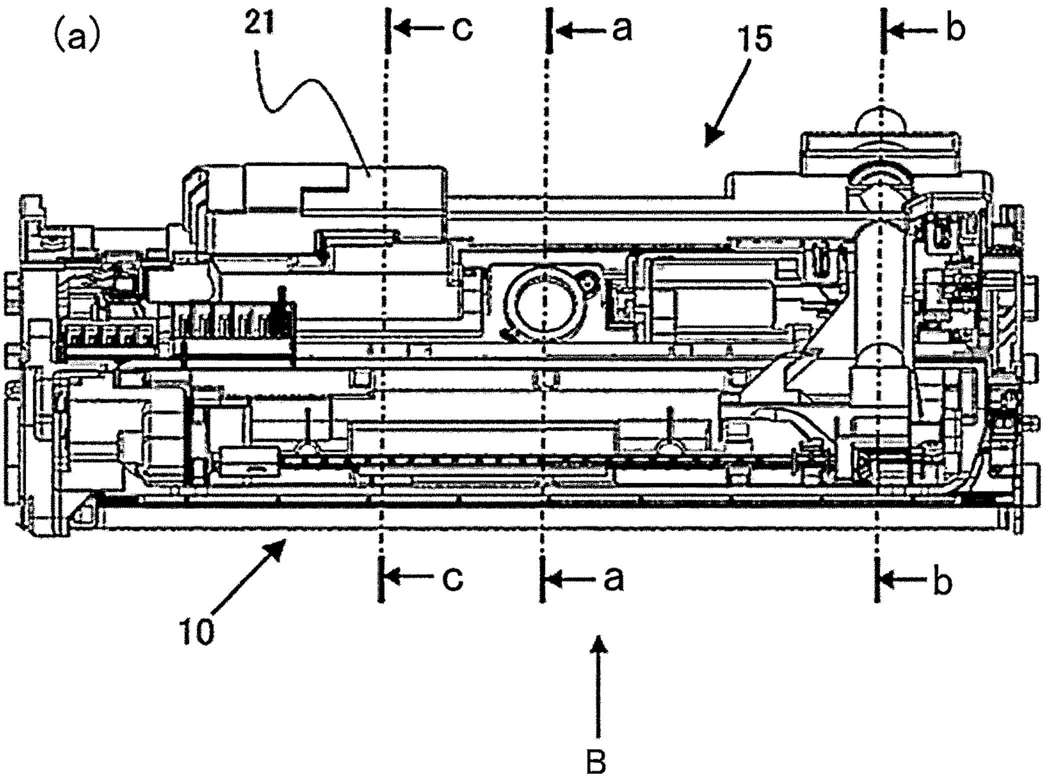
Figure 2:
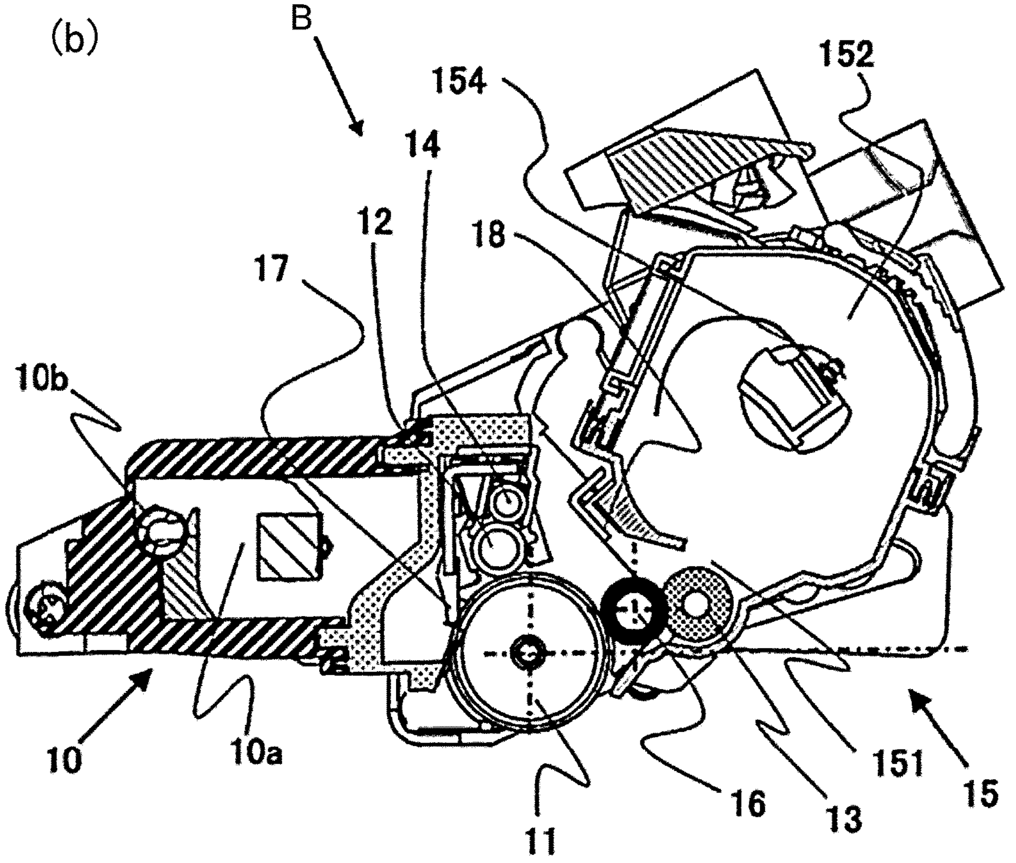

Part (a) of FIG. 2 is a front view of a process cartridge in the embodiment, and part (b) of FIG. 2 is a sectional view of the process cartridge taken along an a-a line of part (a) of FIG. 2.

Figure 3:
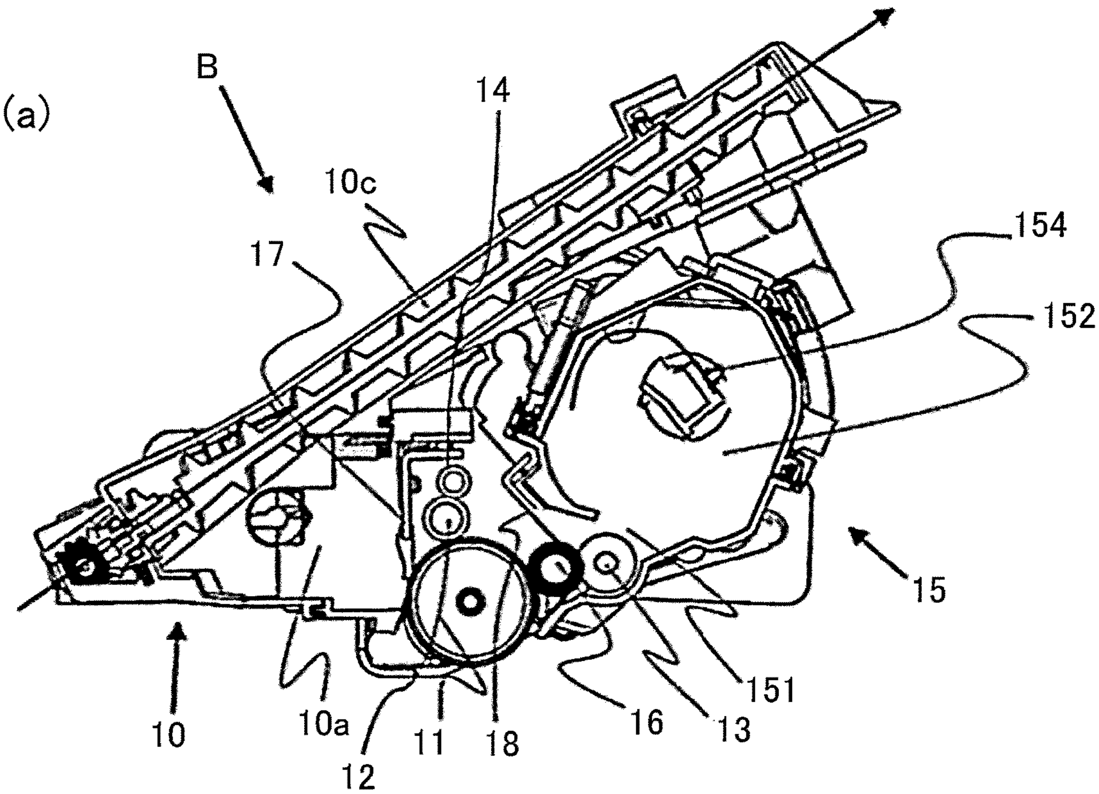
Figure 3:
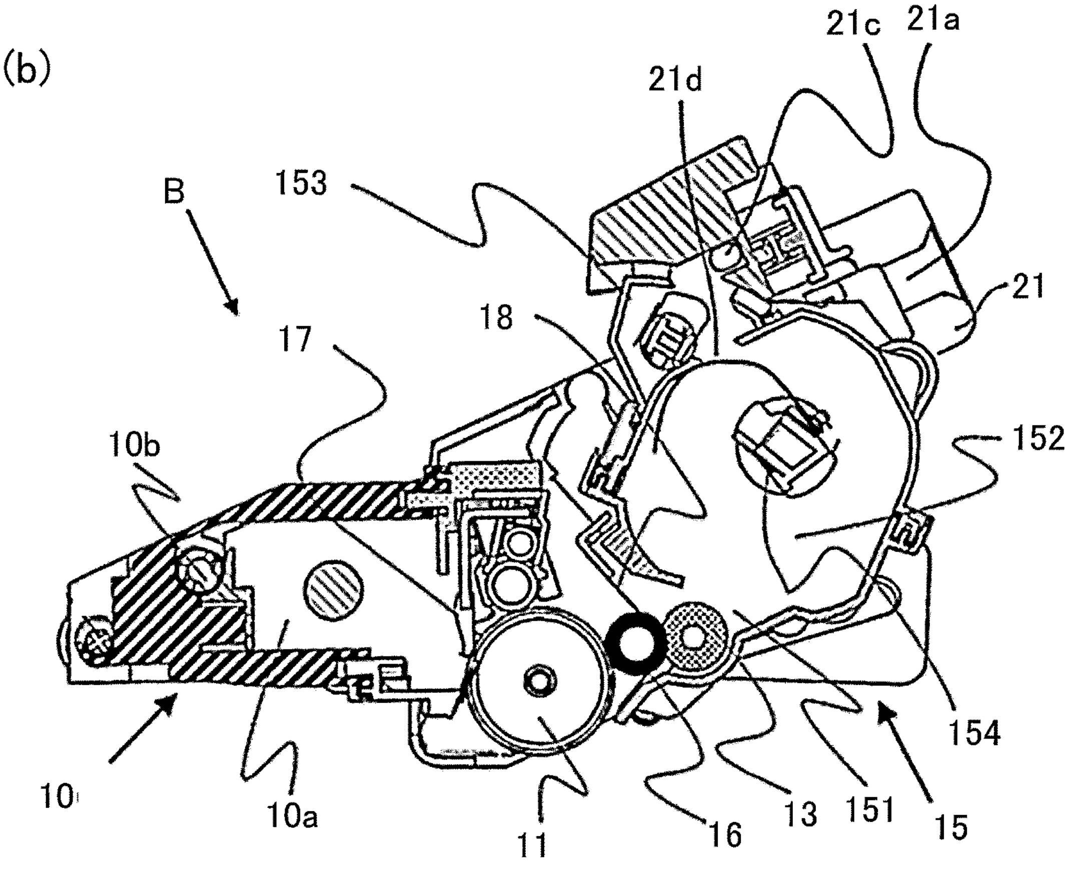

Part (a) of FIG. 3 is a sectional view of the process cartridge taken along a b-b line of part (a) of FIG. 2, and part (b) of FIG. 3 is a sectional view of the process cartridge taken along a c-c line of part (a) of FIG. 2.

Figure 4:
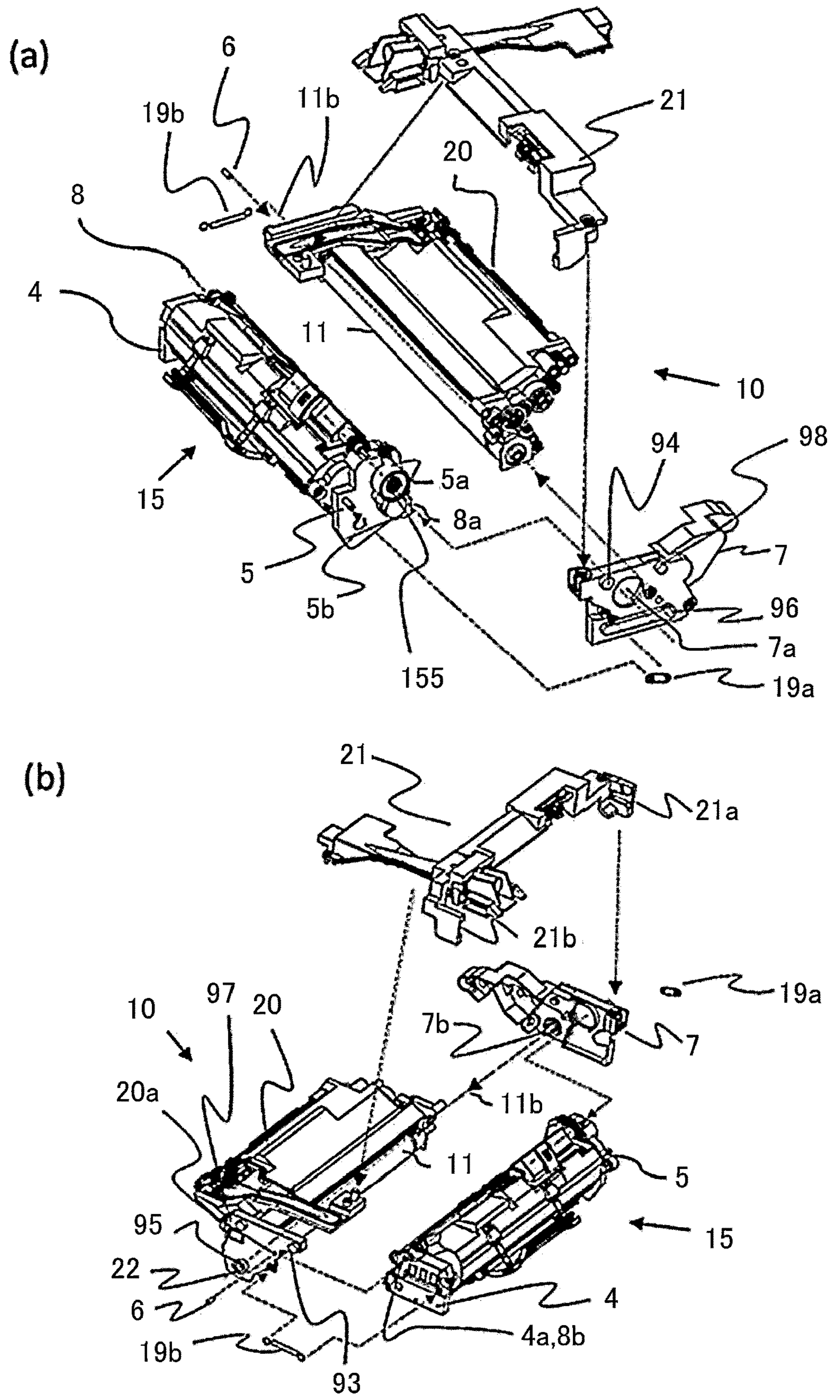

Part (a) of FIG. 4 is an exploded perspective view of the process cartridge in the embodiment, and part (b) of FIG. 4 is an exploded perspective view of the process cartridge as viewed in a direction different from a direction in part (a) of FIG. 4.

Figure 5:
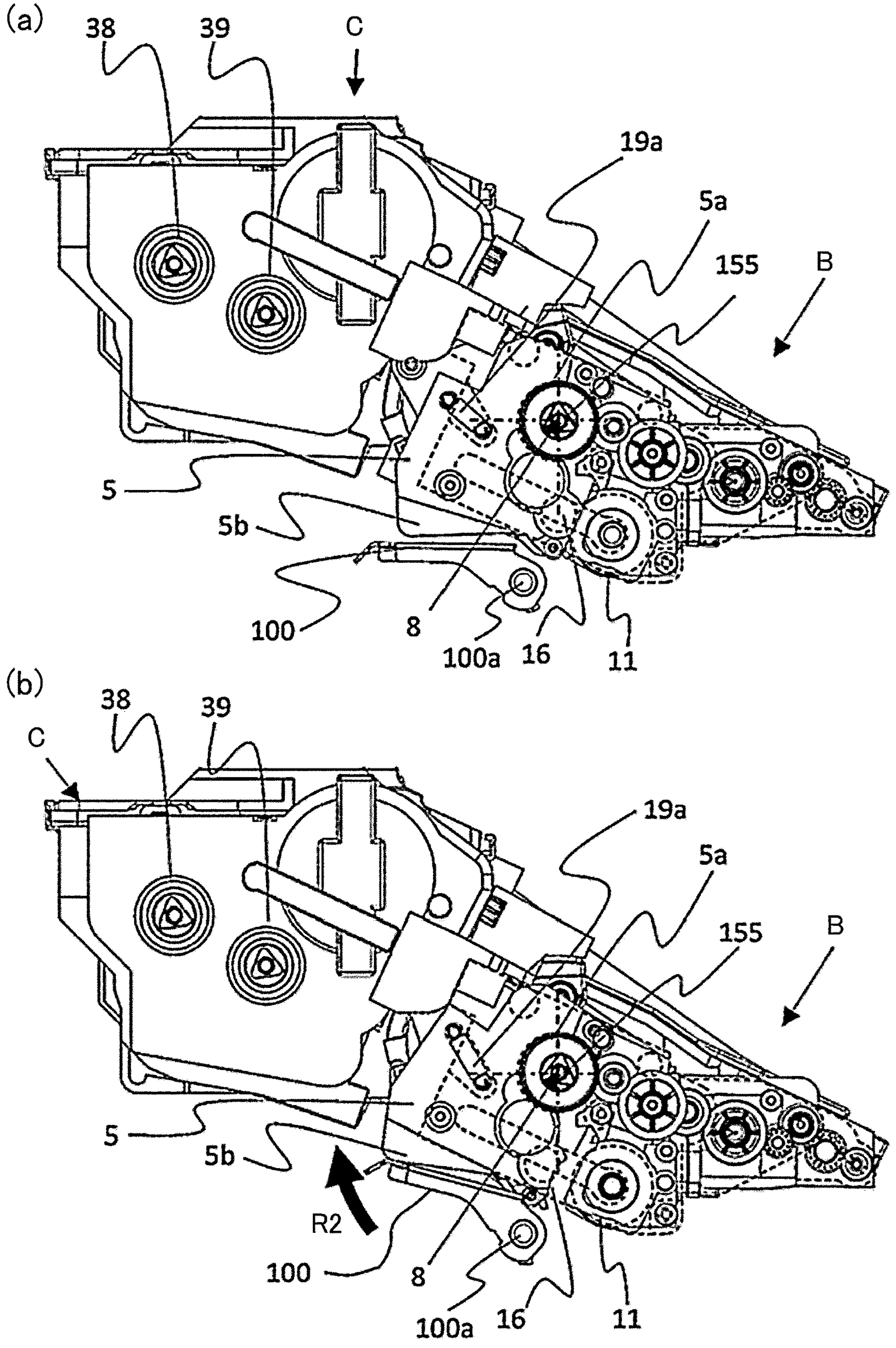

Part (a) of FIG. 5 is a side view of the process cartridge, showing a contact state of a developing unit to a photosensitive drum, and part (b) of FIG. 5 is a side view of the process cartridge, showing a separated state of the developing unit from the photosensitive drum.

Figure 6:
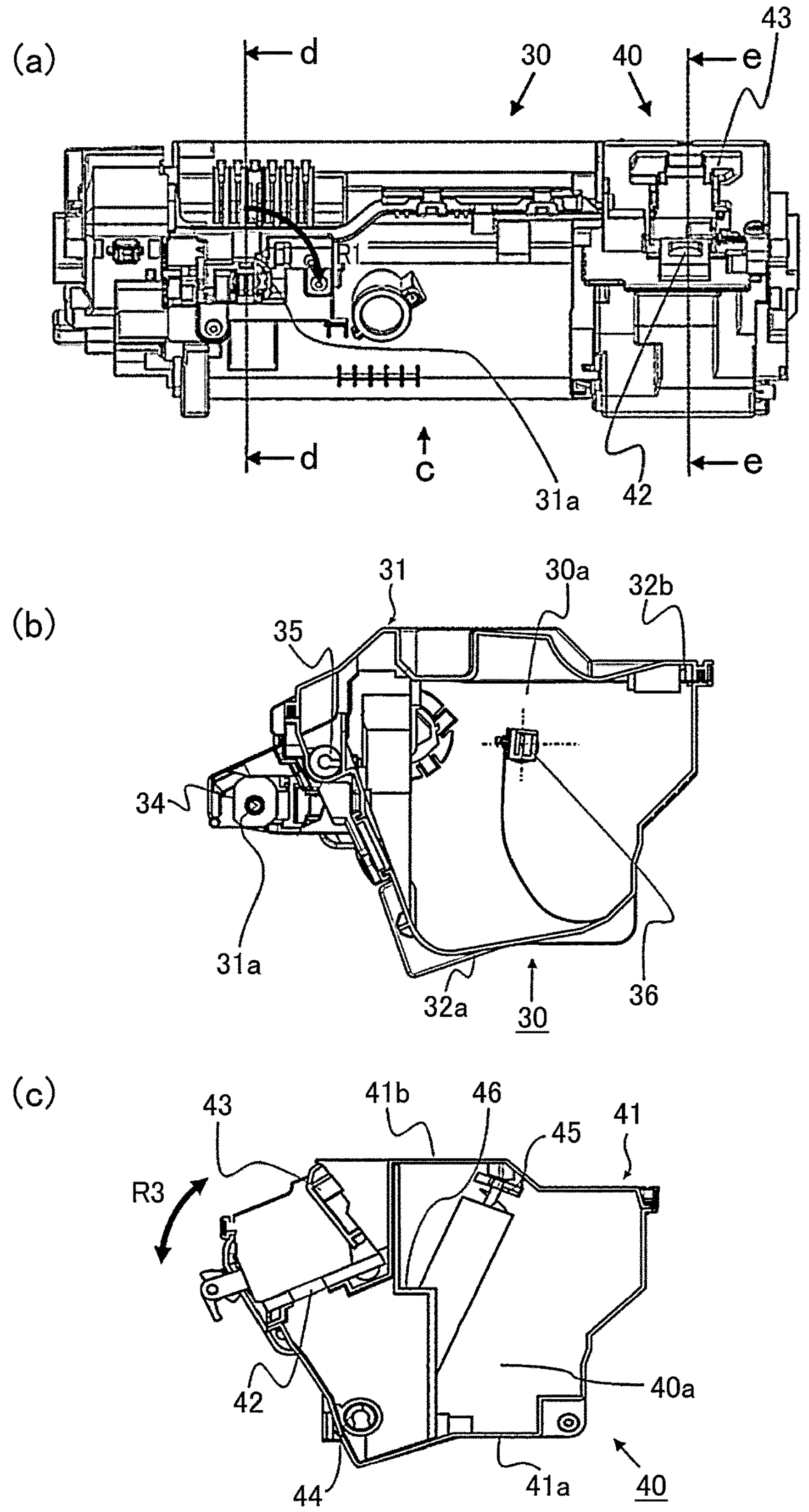

Part (a) of FIG. 6 is a front view of a toner cartridge in the embodiment, part (b) of FIG. 6 is a sectional view of the toner cartridge taken along a d-d line of part (a) of FIG. 6, and part (c) of FIG. 6 is a sectional view of the toner cartridge taken along an e-e line of part (a) of FIG. 6.

Figure 7:
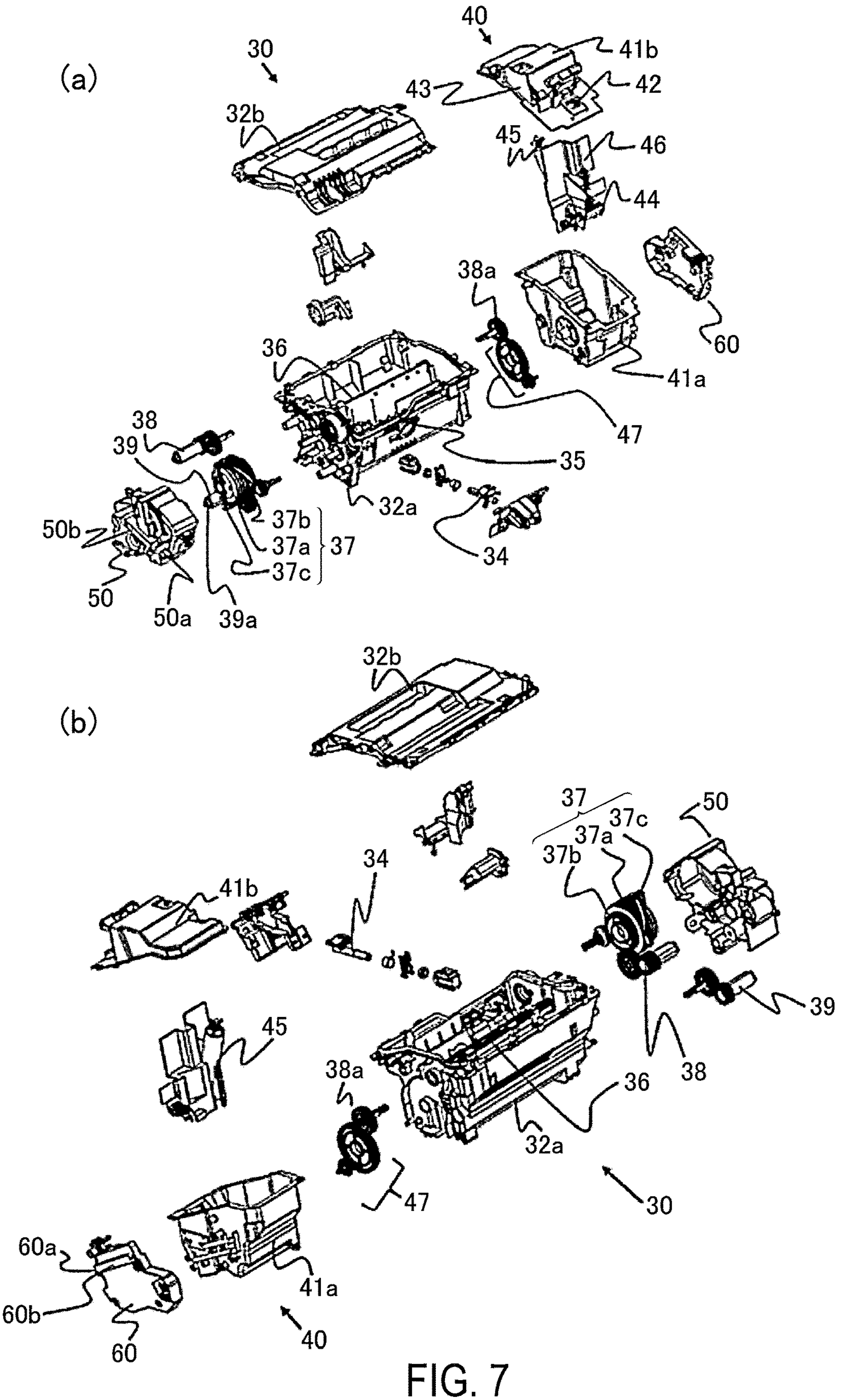

Part (a) of FIG. 7 is an exploded perspective view of the toner cartridge in the embodiment, and part (b) of FIG. 7 is an exploded perspective view of the toner cartridge as viewed in a direction different from a direction in part (a) of FIG. 7.

Figure 8:
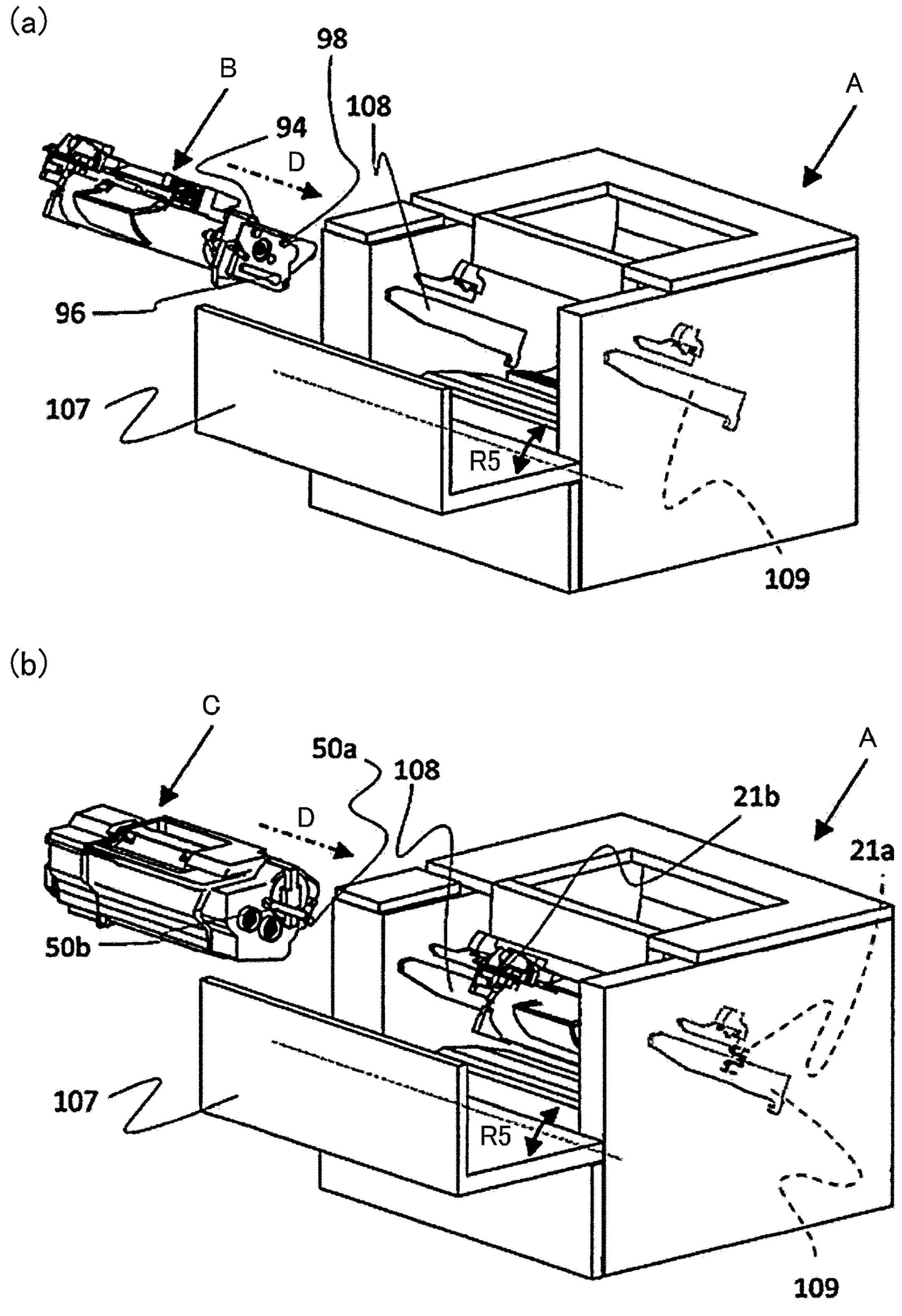

Part (a) of FIG. 8 is a schematic sectional view showing an inserting state of the process cartridge into an apparatus main assembly in the embodiment, and part (b) of FIG. 8 is a schematic sectional view showing an inserting state of the toner cartridge into the apparatus main assembly in the embodiment.

Figure 9:
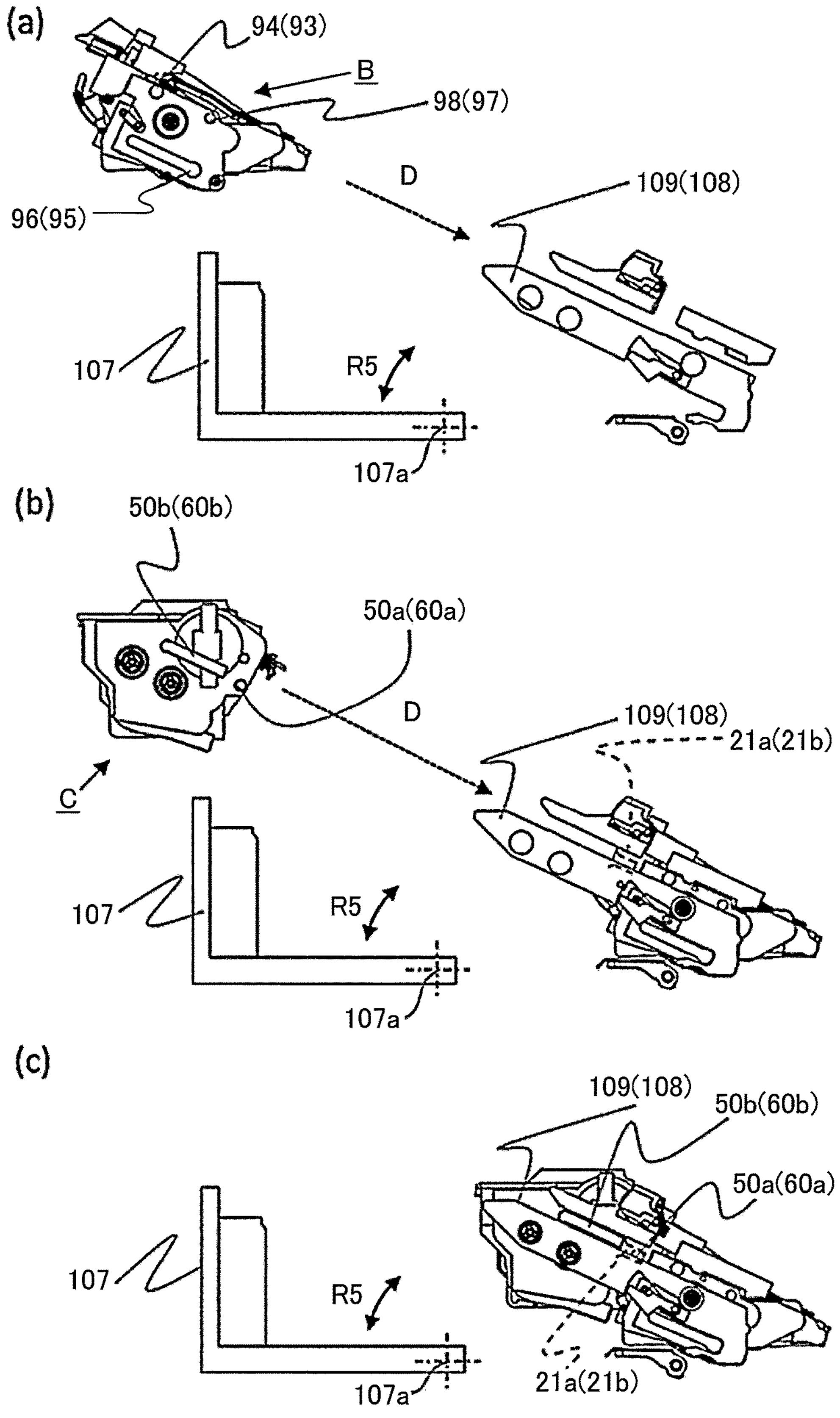

Part (a) of FIG. 9 is a schematic side view showing the inserting state of the process cartridge into the apparatus main assembly in the embodiment, part (b) of FIG. 9 is a schematic side view showing the inserting state of the toner cartridge into the apparatus main assembly in the embodiment, and part (c) of FIG. 9 is a schematic side view showing a mounted state of the process cartridge and the toner cartridge in the apparatus main assembly in the embodiment.

Figure 10:
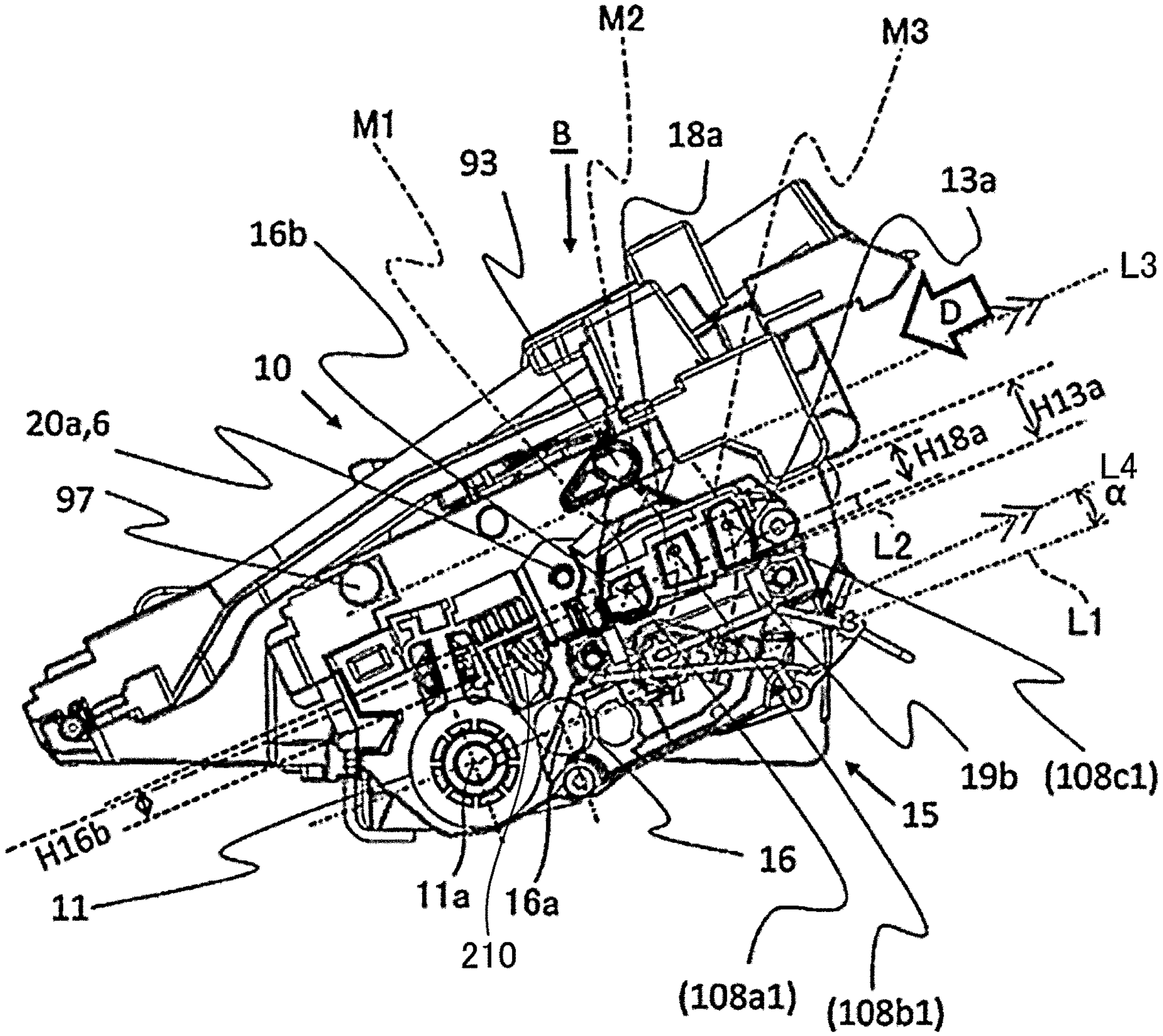

FIG. 10 is a side view of the process cartridge in the embodiment.

Figure 11:
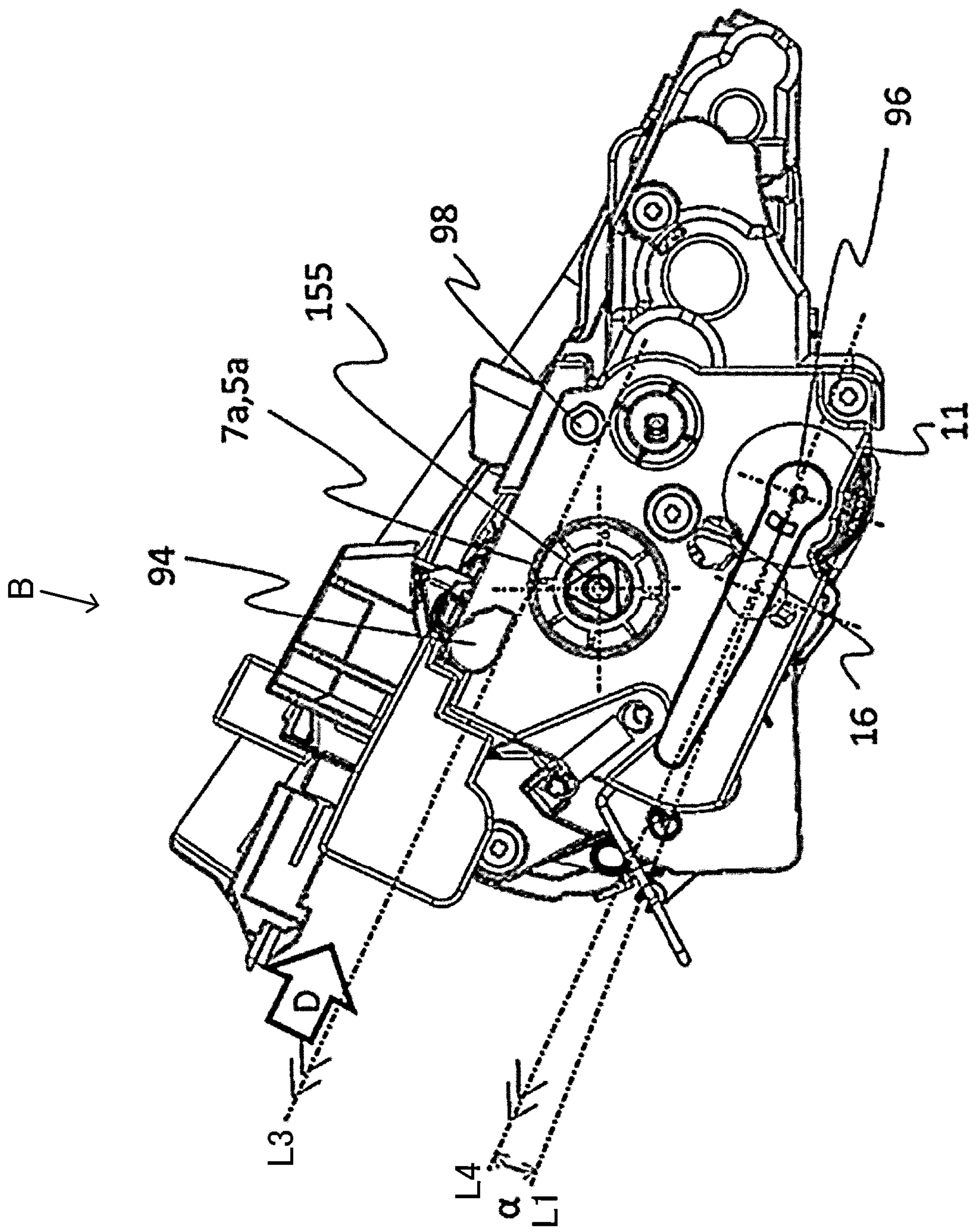

FIG. 11 is a side view of the process cartridge as viewed from a side opposite from the side in FIG. 10 in the embodiment.

Figure 12:
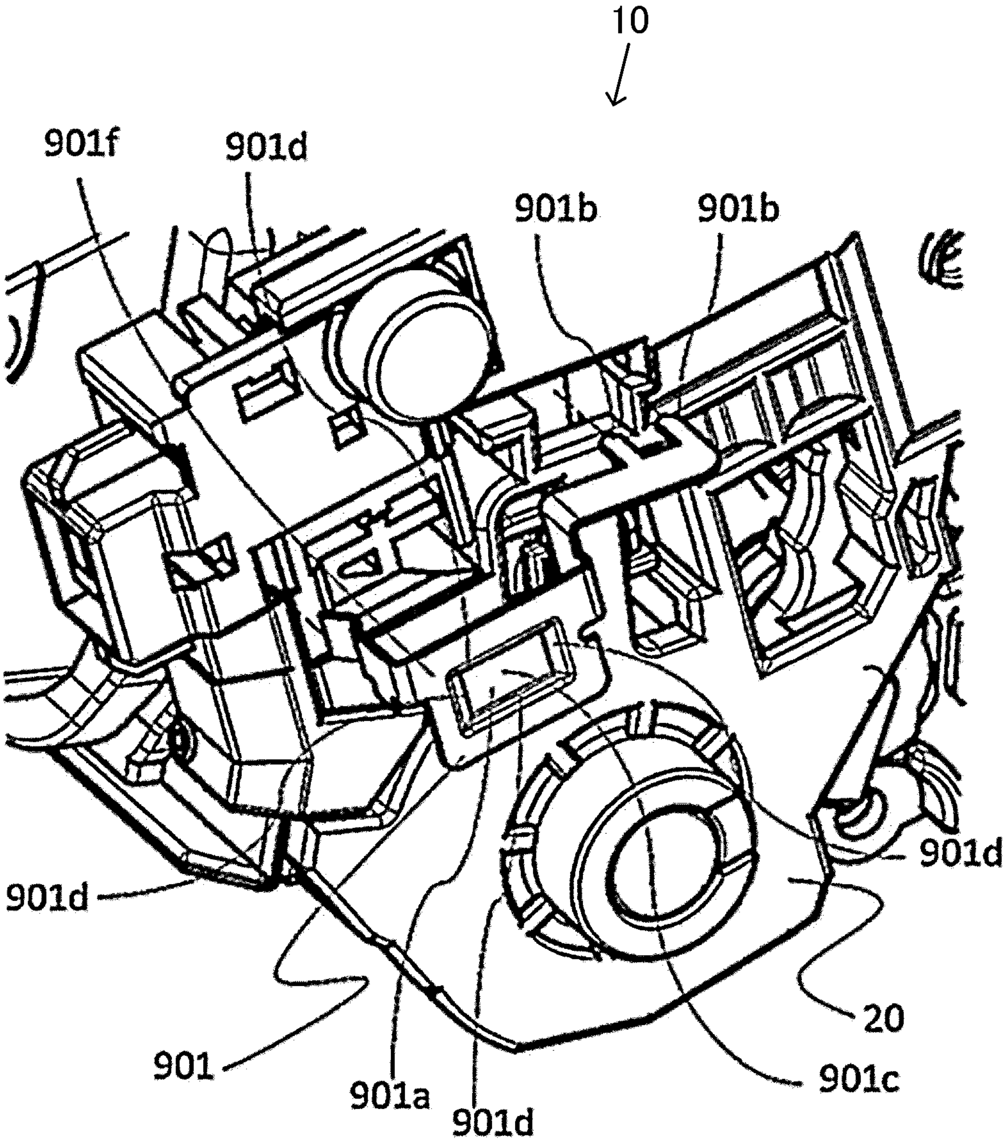

FIG. 12 is a perspective view showing a principal portion of a periphery of an electrode member of the process cartridge in the embodiment.

Figure 13:
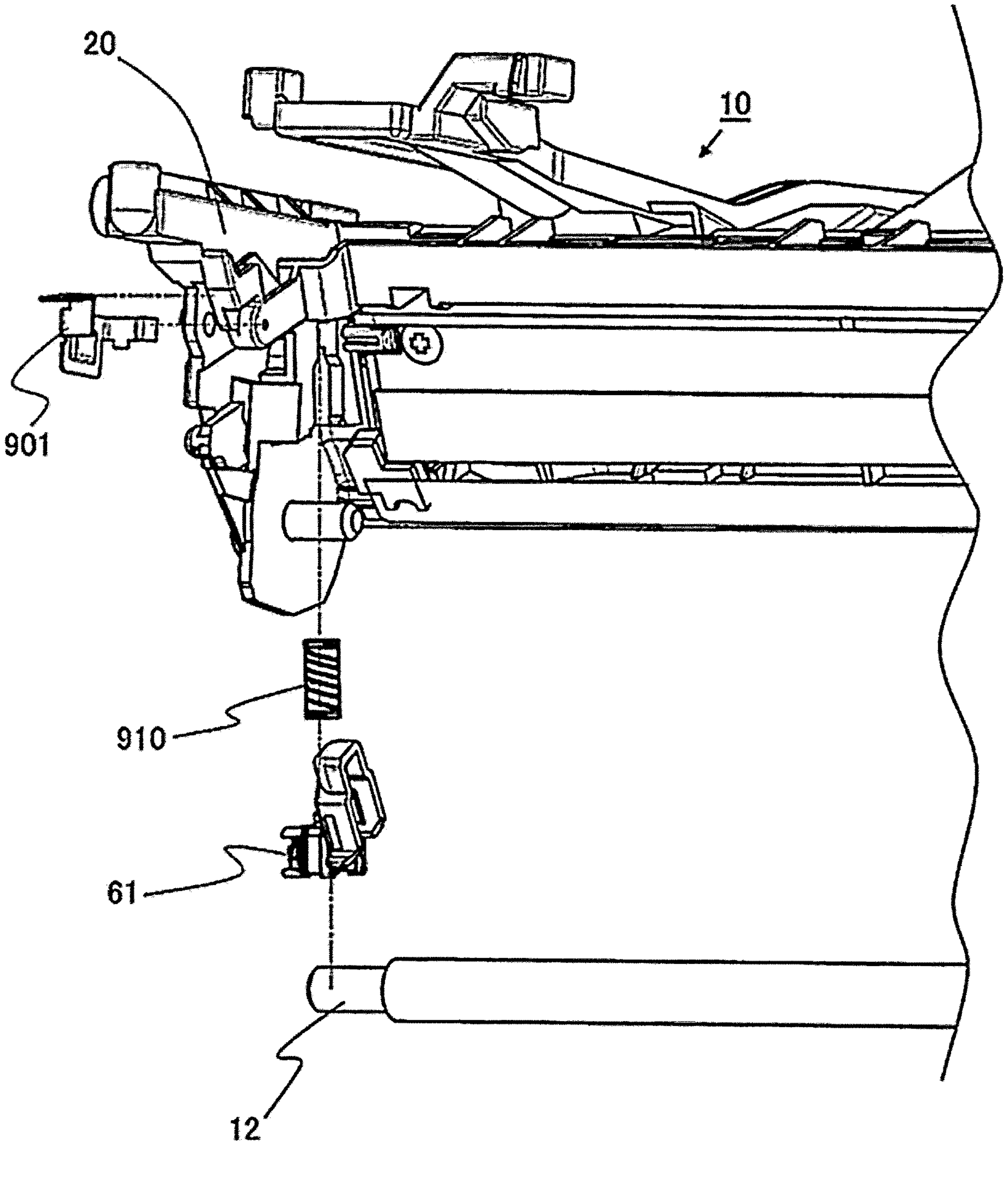

FIG. 13 is an exploded perspective view showing an extracted part of a structure of the periphery of the electrode member of the process cartridge in the embodiment.

Figure 14:
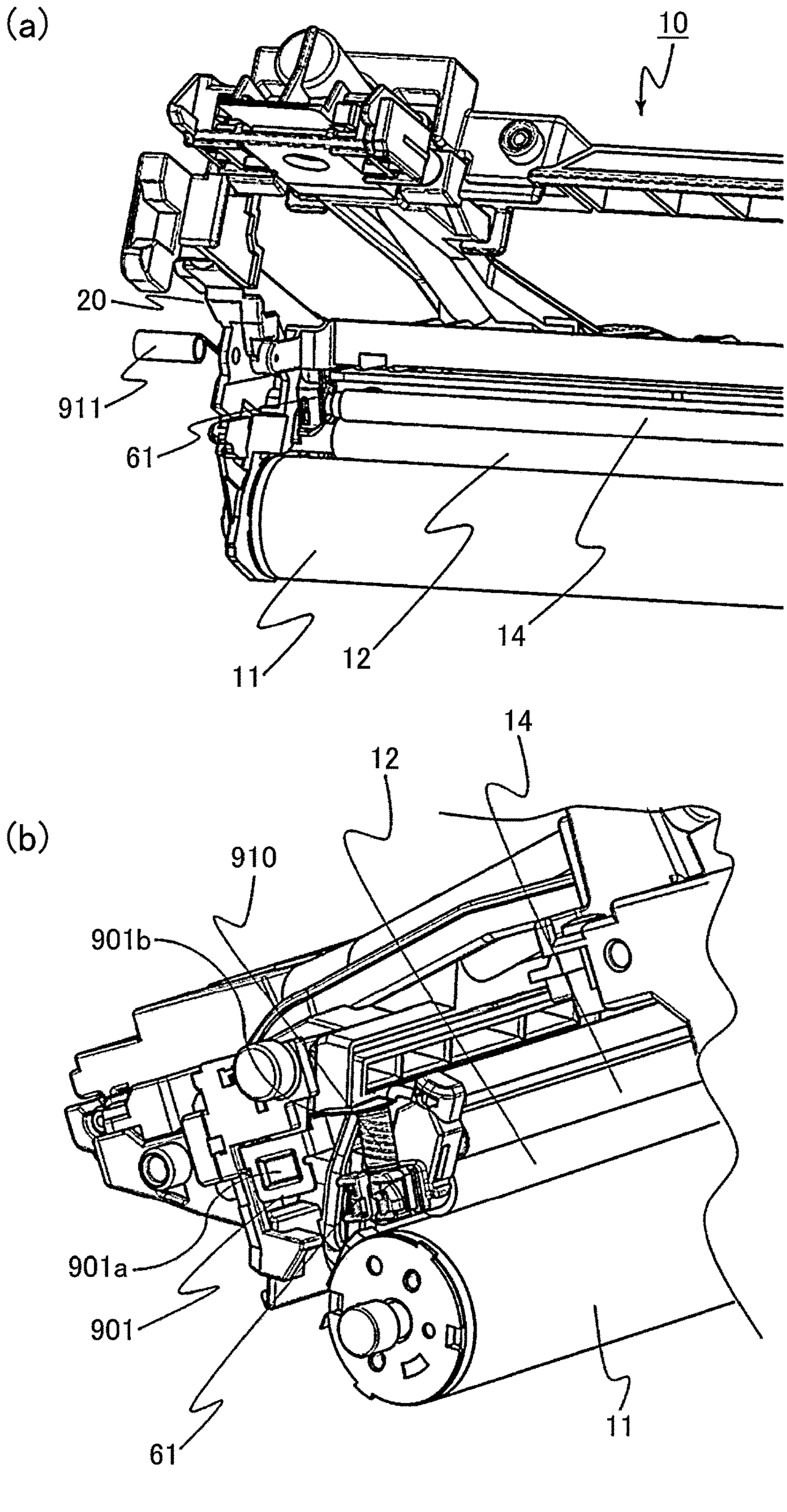

Part (a) of FIG. 14 is a perspective view of the extracted part of the structure of the periphery of the electrode member of the process cartridge as viewed from a charging roller side in the embodiment, and part (b) of FIG. 14 is a perspective view of the extracted part of the structure of the periphery of the electrode member of the process cartridge as viewed from an electrode member side.

Figure 15:
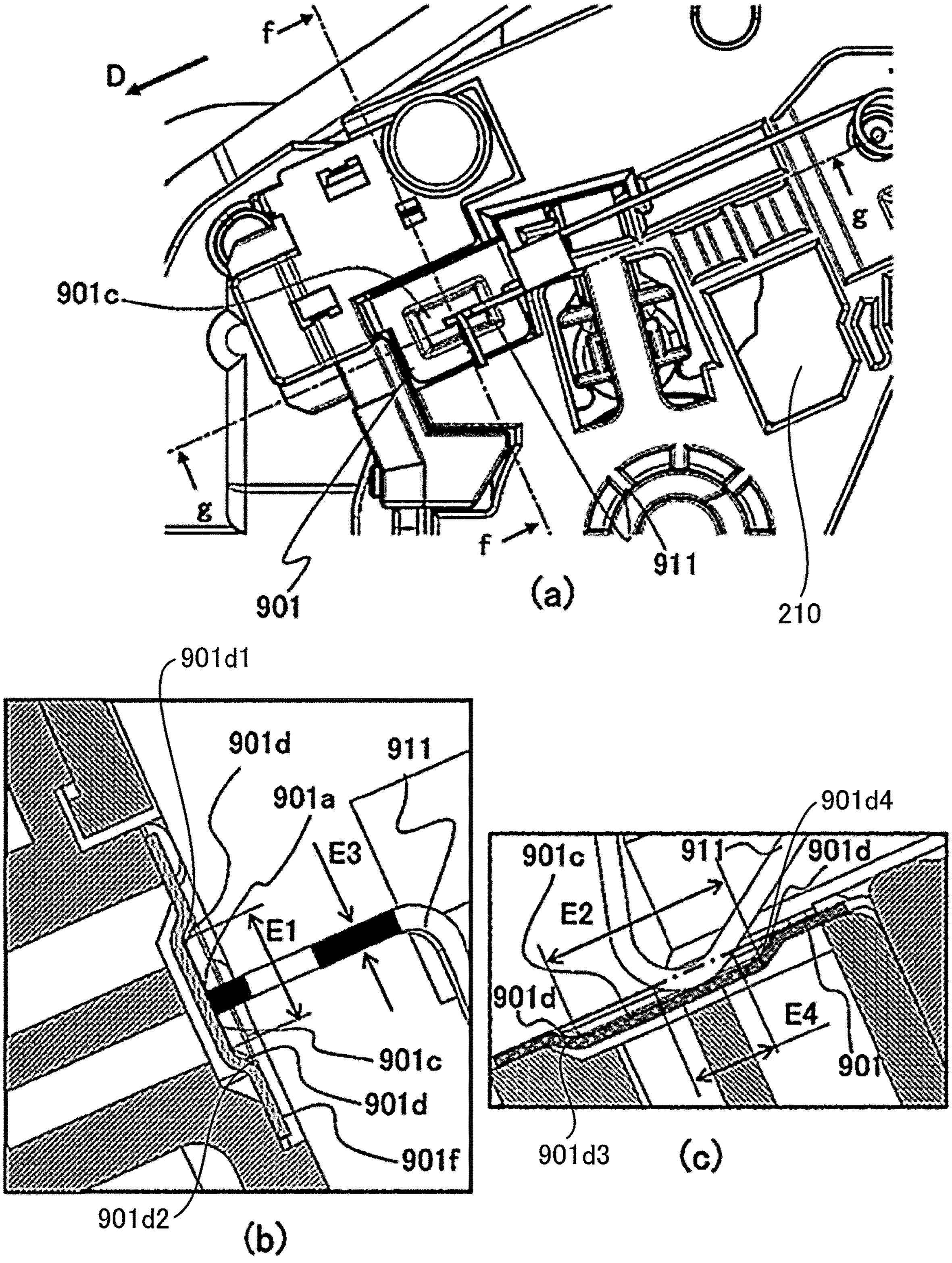

Part (a) of FIG. 15 is a front view showing a relationship between the electrode member of the process cartridge and a spring contact of the apparatus main assembly in the embodiment, part (b) of FIG. 15 is a sectional view taken along an f-f line of part (a) of FIG. 15, and part (c) of FIG. 15 is a sectional view taken along a g-g line of part (a) of FIG. 15.

Figure 16:
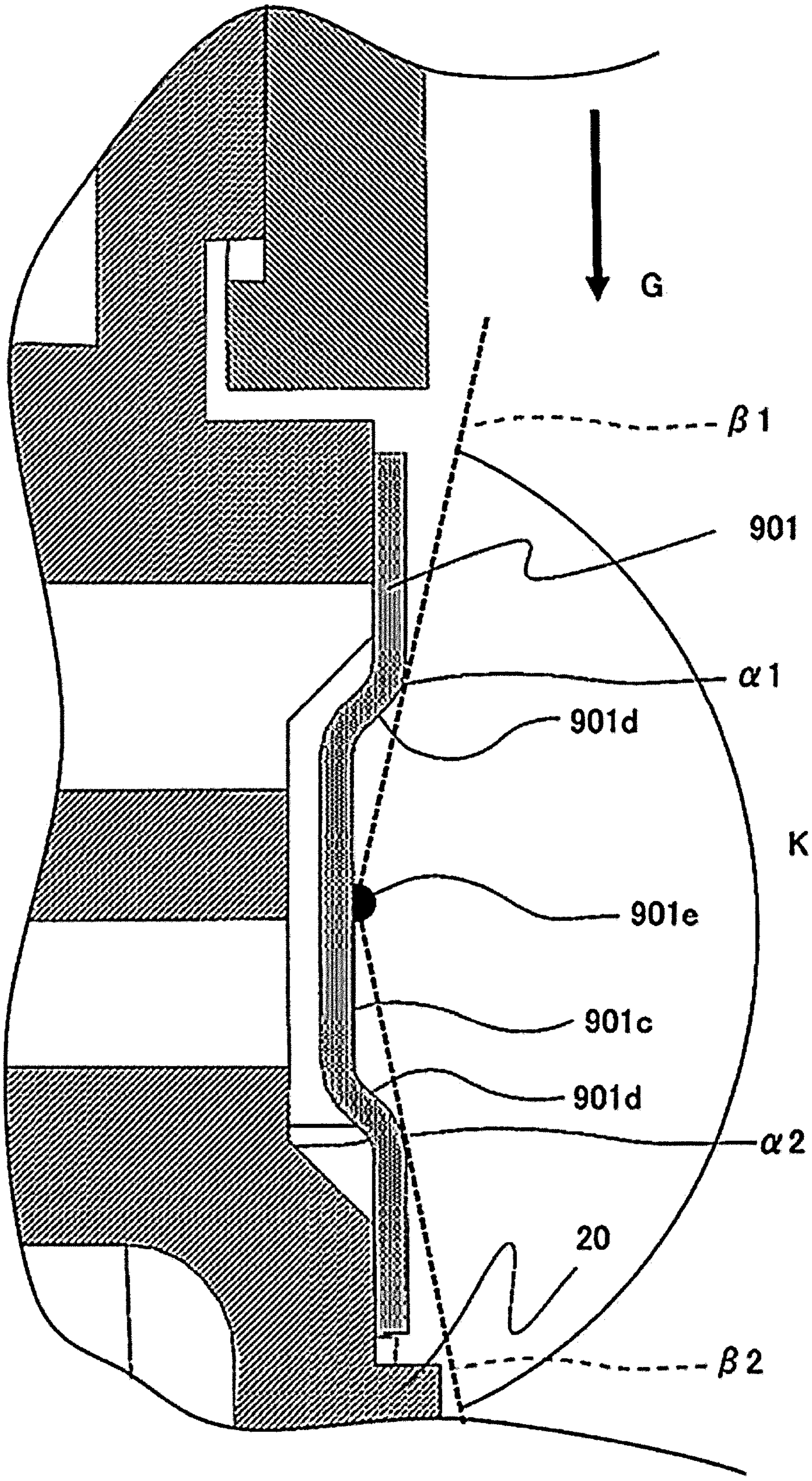

FIG. 16 is a sectional view for illustrating a restricting range of a spark in the electrode member in the embodiment.

Figure 17:
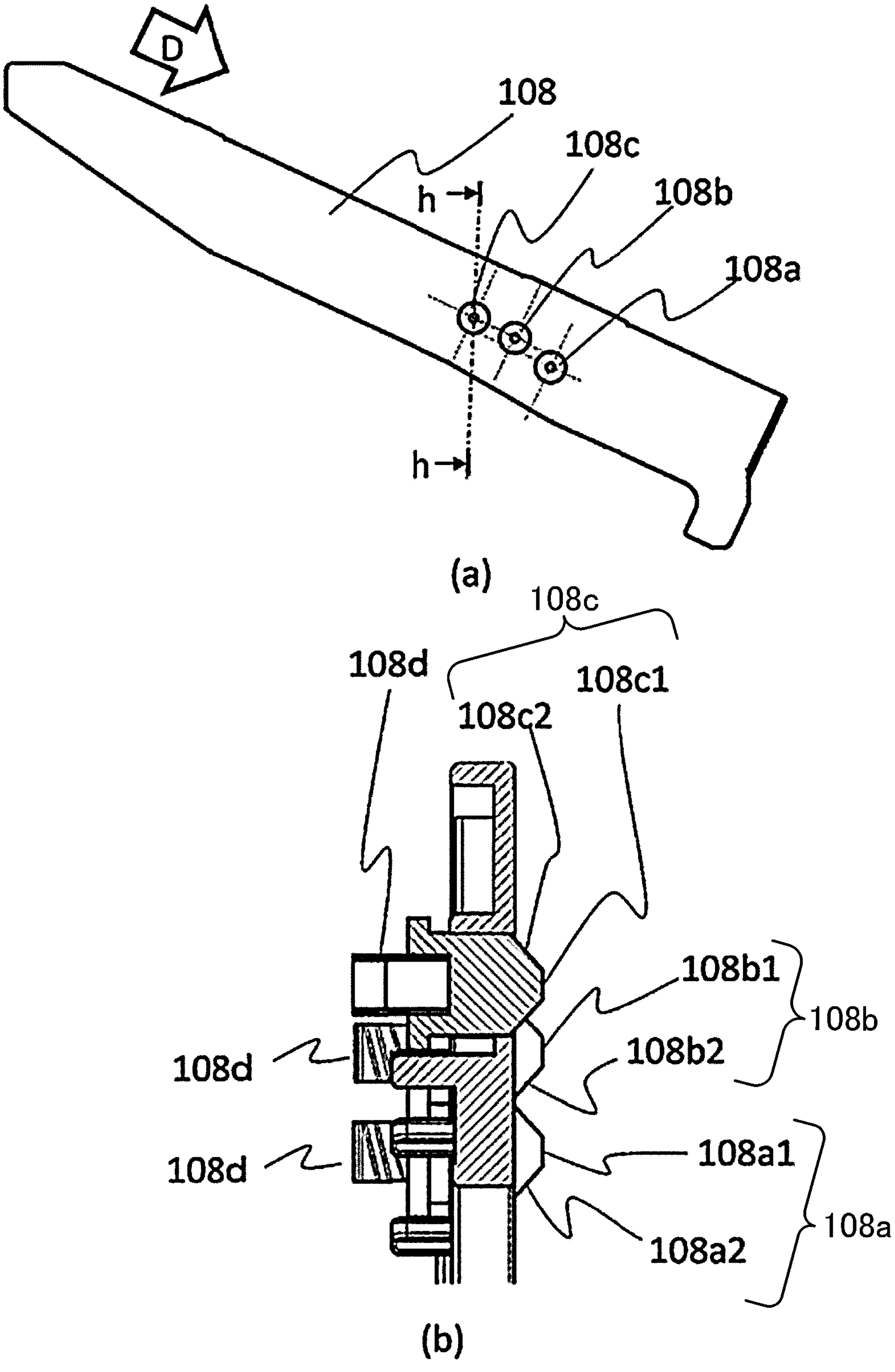

Part (a) of FIG. 17 is a front view in which a structure of a periphery of an electrical contact of the apparatus main assembly corresponding to an electrical contact of the developing unit of the process cartridge in the embodiment is extracted, and part (b) of FIG. 7 is a sectional view taken along an h-h line of part (a) of FIG. 17.

Figure 18:
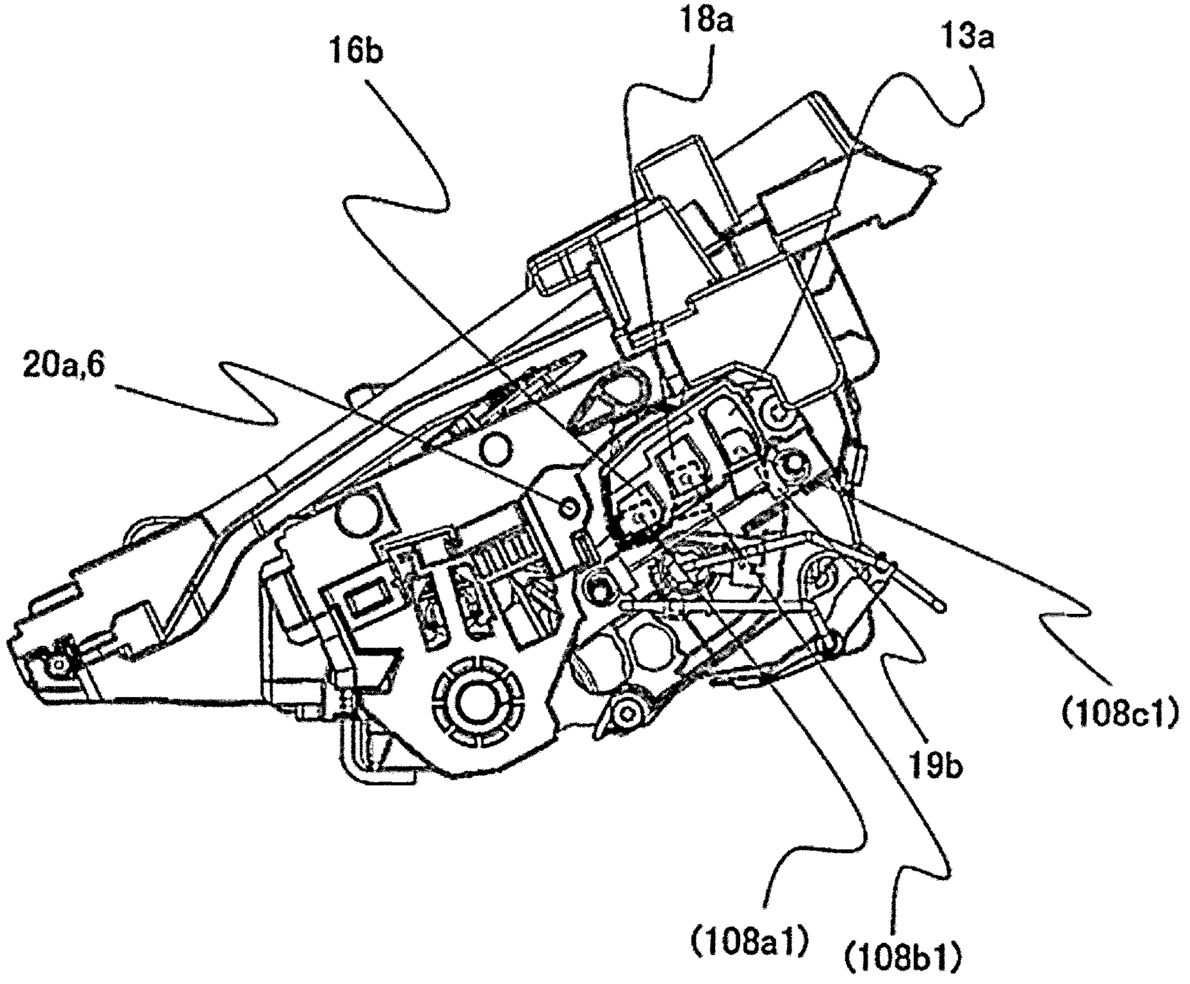

FIG. 18 is a side view of the process cartridge in a separated state between the photosensitive drum and the developing roller in the embodiment.

Figure 19:
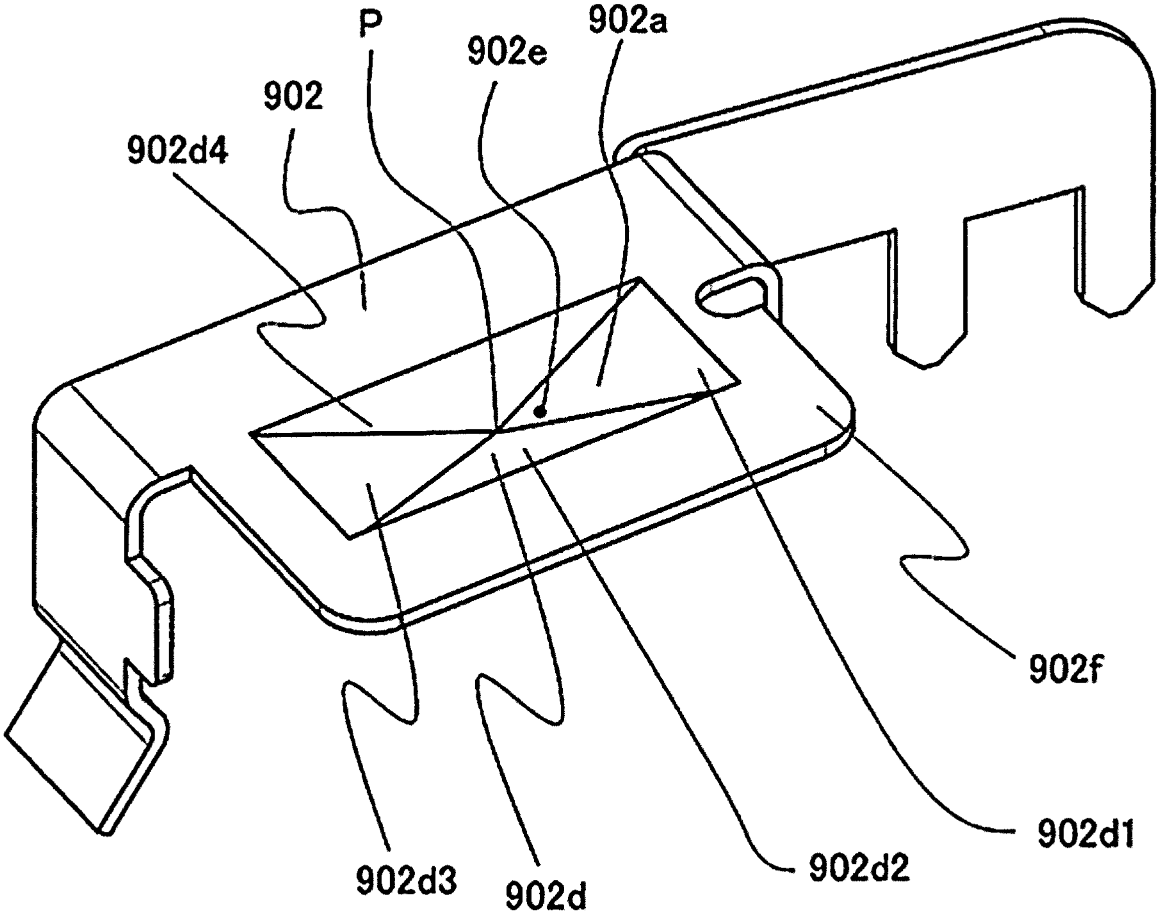

FIG. 19 is a perspective view of an electrode member in the embodiment.

Figure 20:
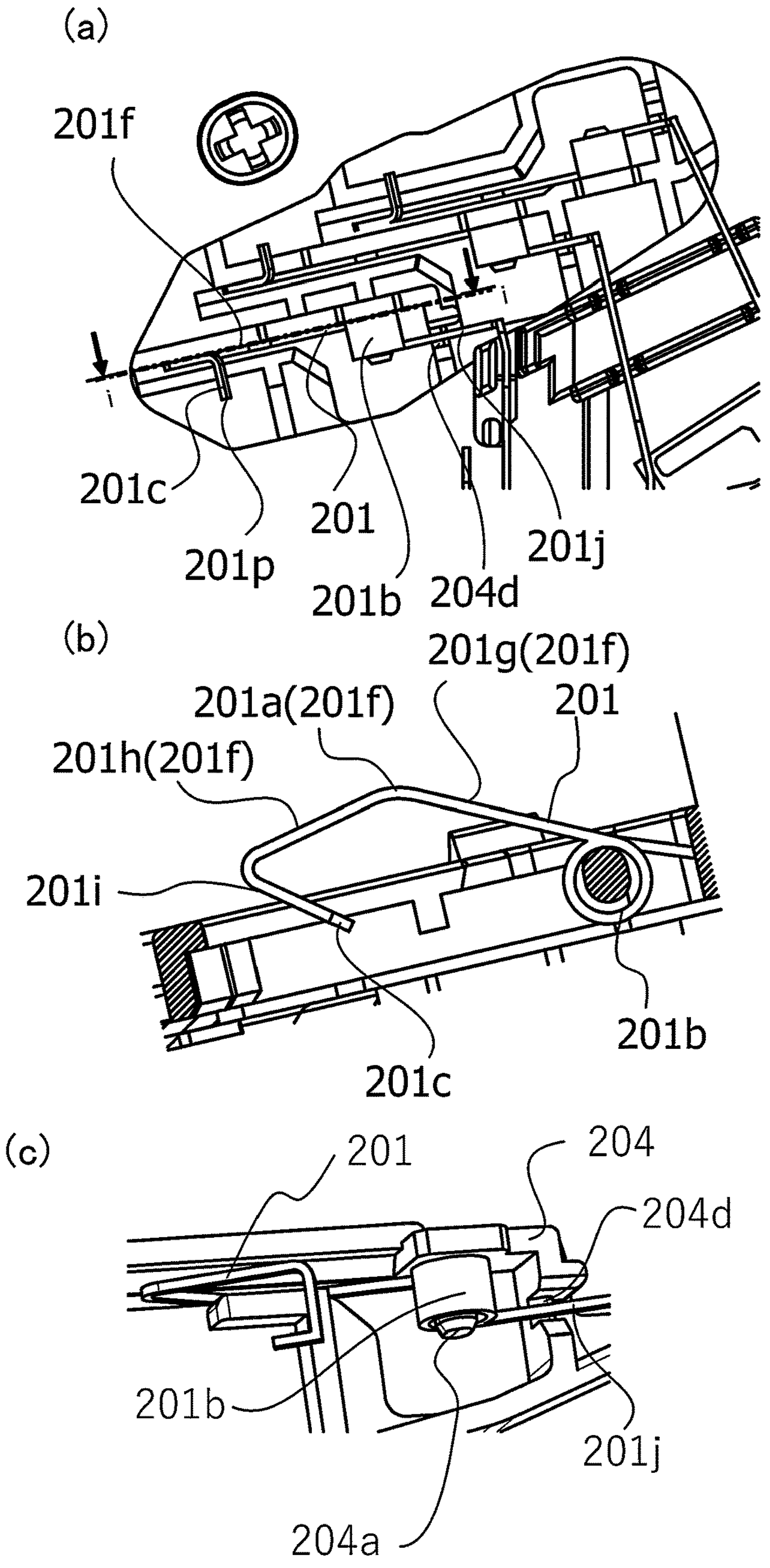

Part (a) of FIG. 20 is a front view showing an electrical contact portion of an apparatus main assembly using a conventional torsion coil spring for comparison with an embodiment 1, part (b) of FIG. 20 is a sectional view taken along an i-i line of part (a) of FIG. 20, and part (c) of FIG. 20 is a schematic view for illustrating a rotation stopper.

Figure 21:
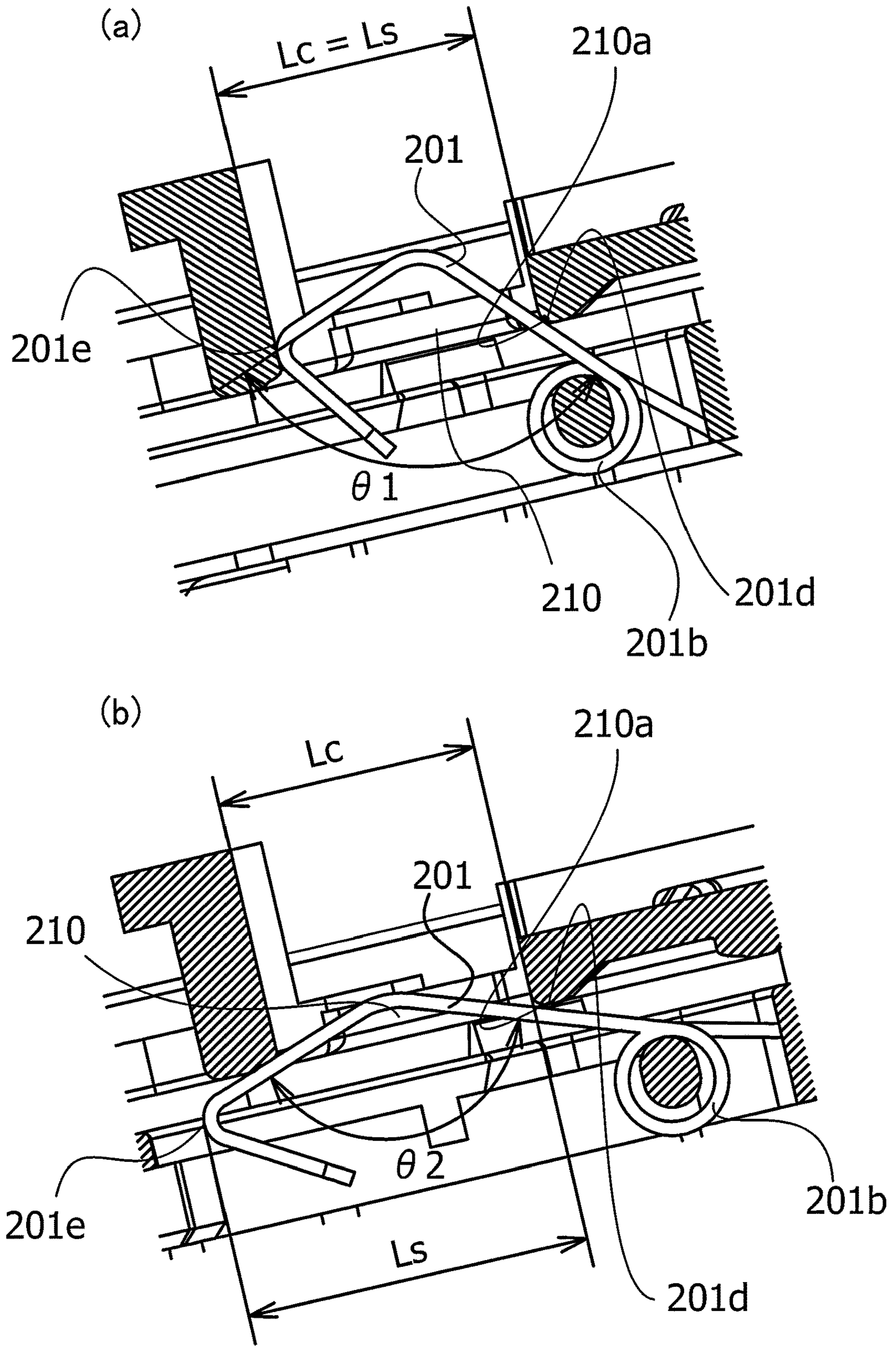

Parts (a) and (b) of FIG. 21 are sectional views each showing the electrical contact portion of the apparatus main assembly using the conventional torsion coil spring for comparison with the embodiment 1.

Figure 22:
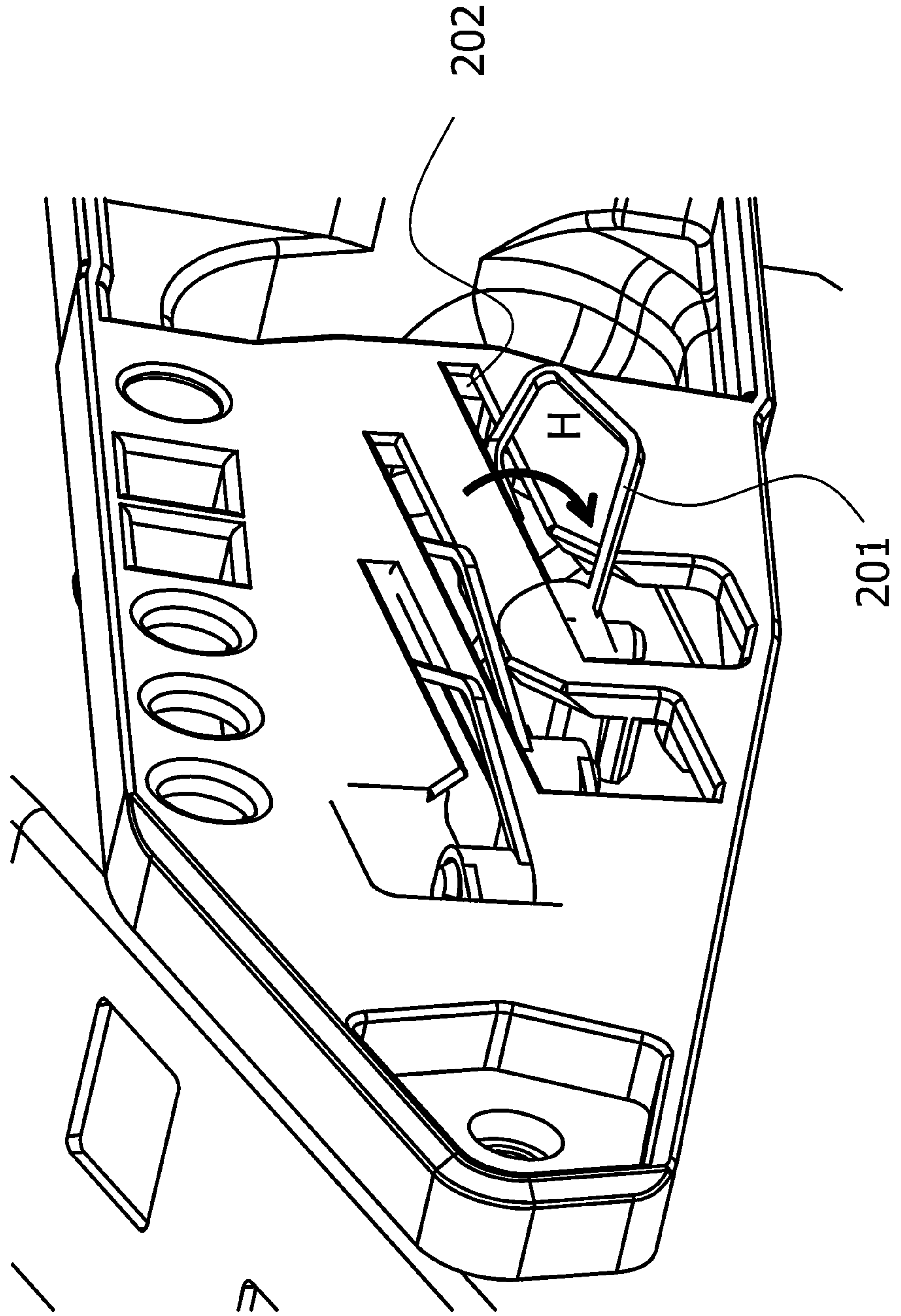

FIG. 22 is a perspective view showing the electrical contact portion of the apparatus main assembly using the conventional torsion coil spring for comparison with the embodiment 1.

Figure 23:
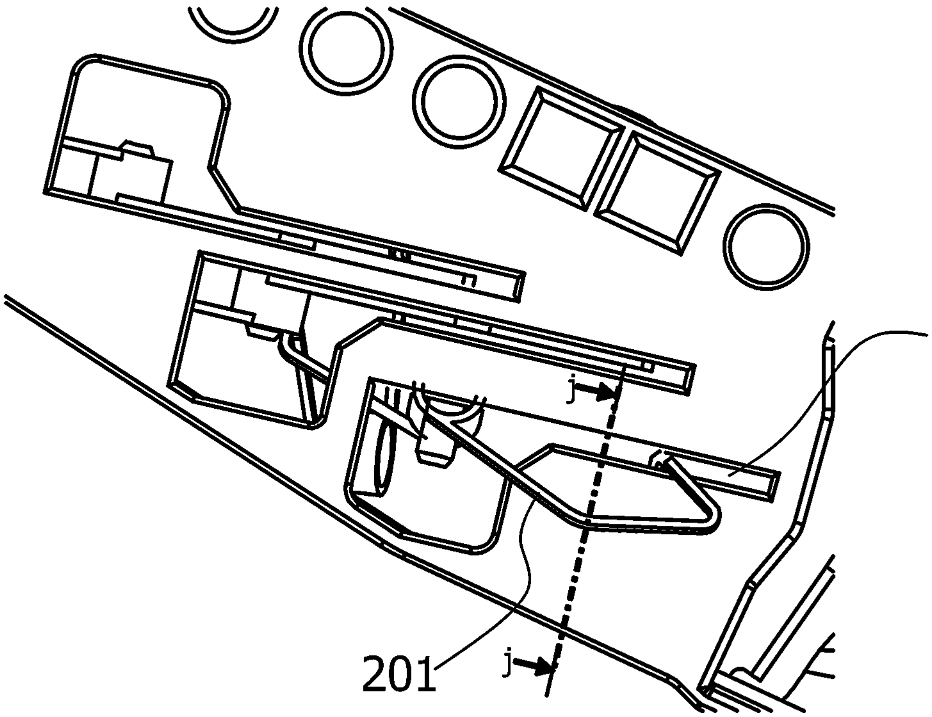
Figure 23:
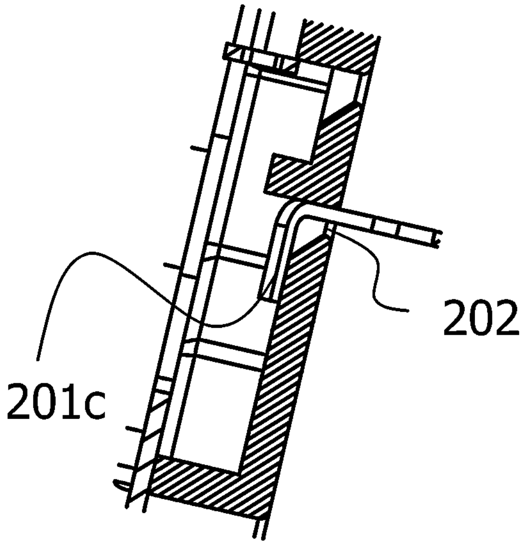
Figure 23:
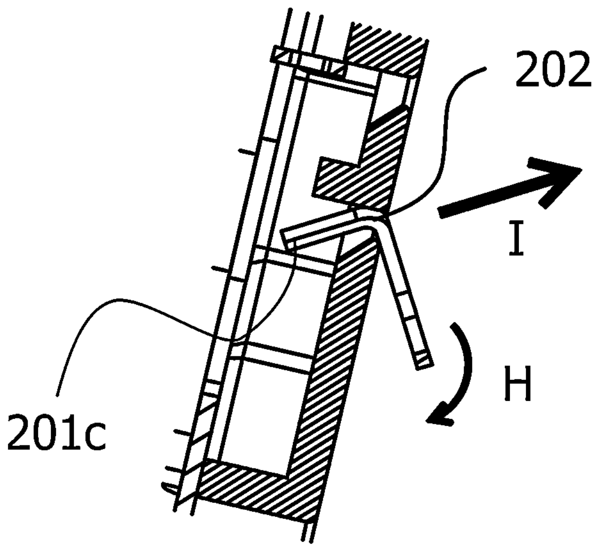

Parts (a) to (c) of FIG. 23 are schematic views each showing the conventional torsion coil spring for comparison with the embodiment 1, in which part (a) is the schematic view showing the electrical contact portion of the apparatus main assembly using the conventional torsion coil spring as viewed from an inside of the apparatus main assembly, part (b) is a sectional view taken along a j-j line of part (a) before the conventional torsion coil spring is inclined, and part (c) is a sectional view taken along the j-j line of part (a) after the conventional torsion coil spring is inclined.

Figure 24:
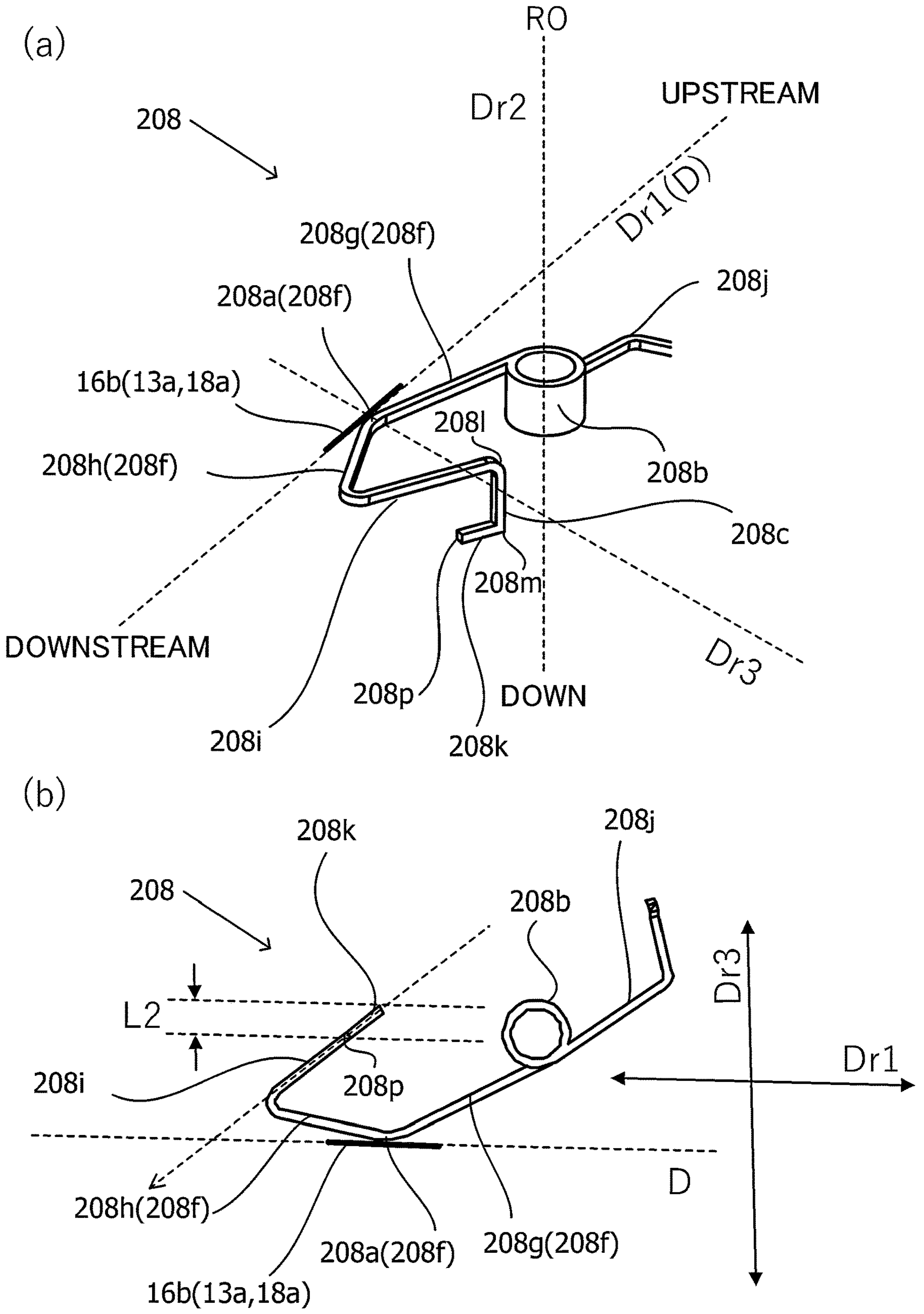

Part (a) of FIG. 24 is a perspective view showing a structure of a torsion coil spring in the embodiment 1, and part (b) of FIG. 24 is a sectional view of the torsion coil spring as viewed from below.

Figure 25:
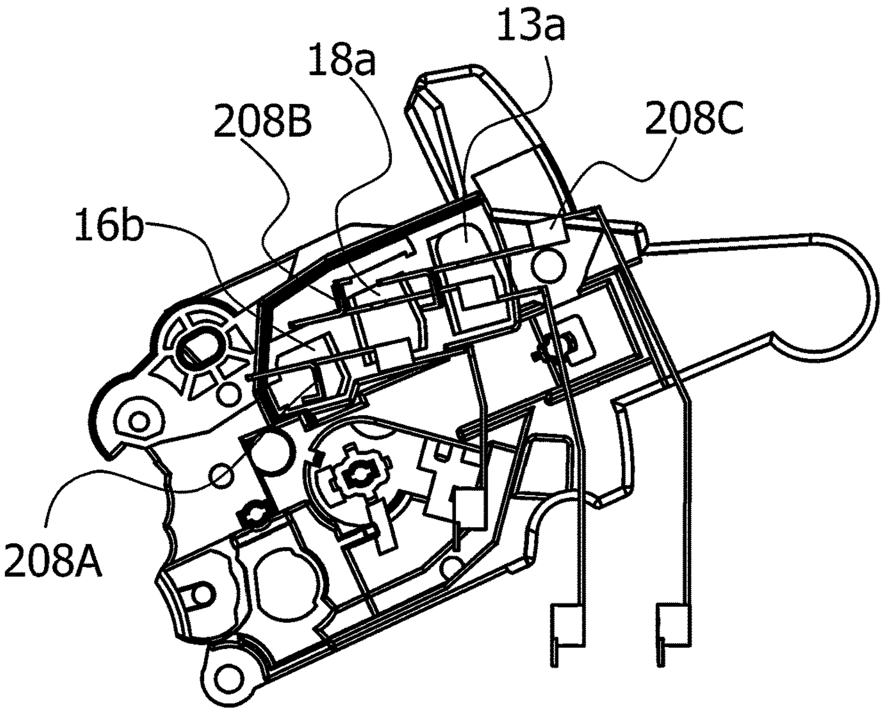
Figure 25:
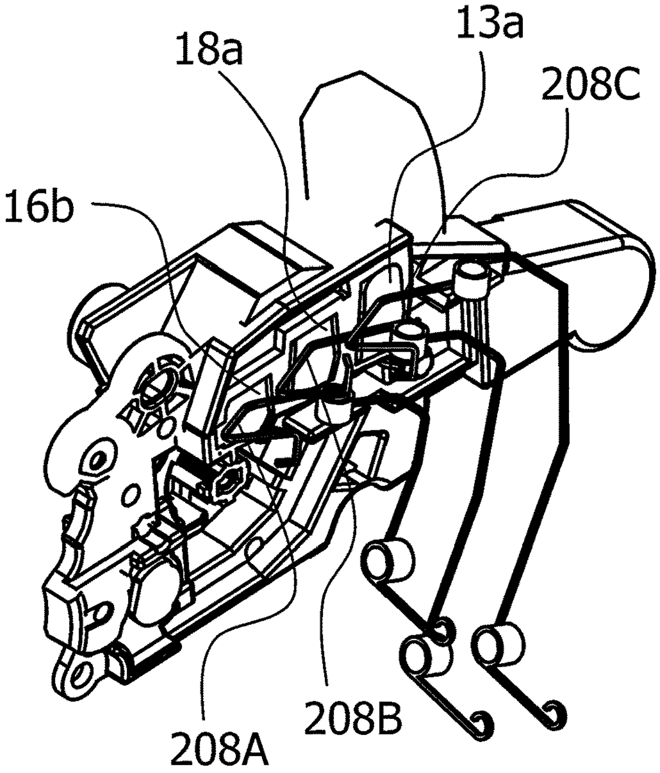

Part (a) of FIG. 25 is a front view showing a contact state between an electrical contact portion of an apparatus main assembly using the torsion coil spring and an electrode member of a process cartridge in the embodiment 1, and part (b) of FIG. 25 is a perspective view showing the contact portion.

Figure 26:
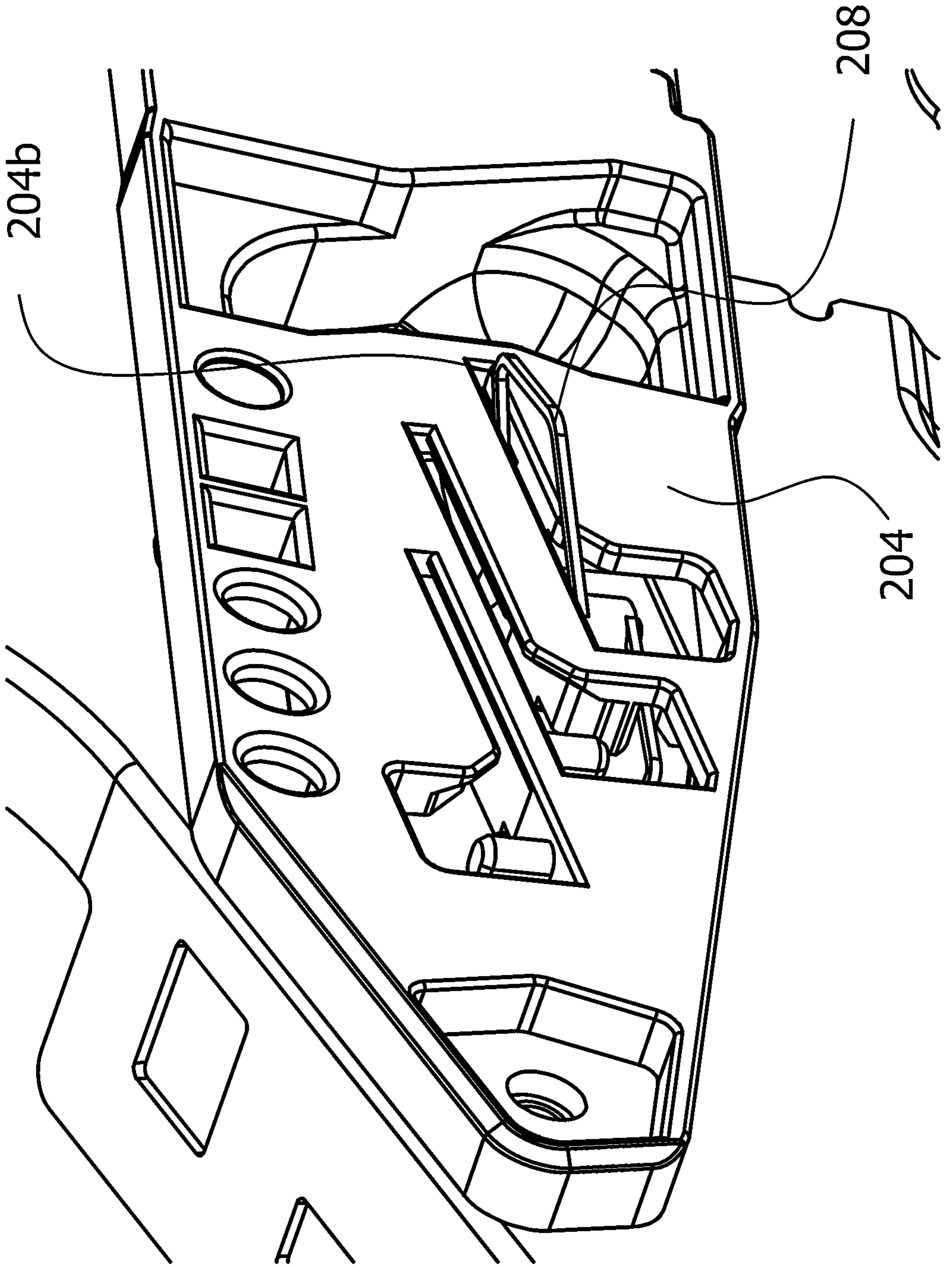

FIG. 26 is a perspective view showing the electrical contact portion of the apparatus main assembly using the torsion coil spring in the embodiment 1.

Figure 27:
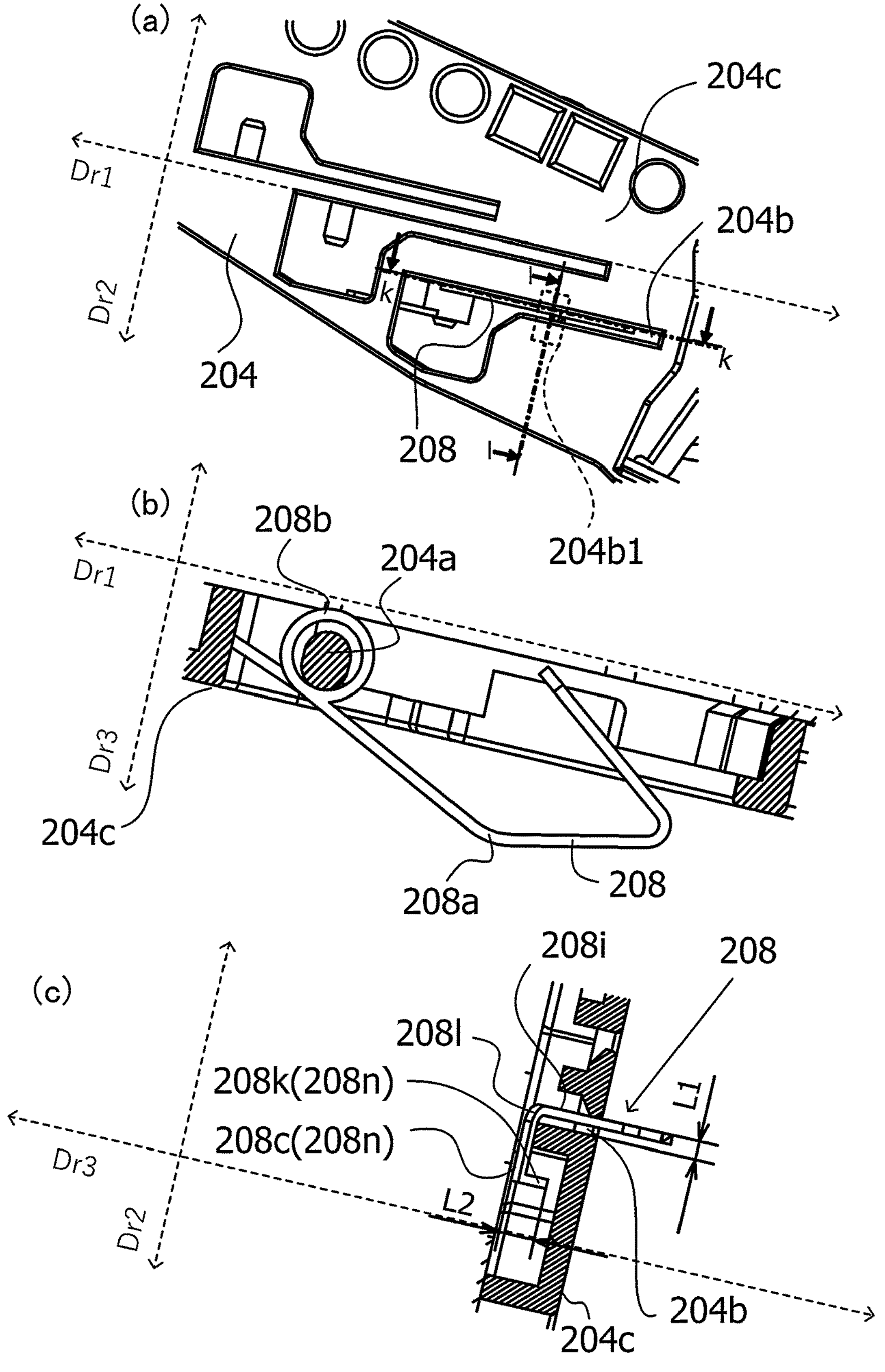

Part (a) of FIG. 27 is a sectional view showing the electrical contact portion of the apparatus main assembly using the torsion coil spring as viewed from the inside of the apparatus main assembly, part (b) of FIG. 27 is a sectional view taken along a k-k line of part (a) of FIG. 27, and part (c) of FIG. 27 is a sectional view taken along an 1-1 line of part (a) of FIG. 27.

Figure 28:
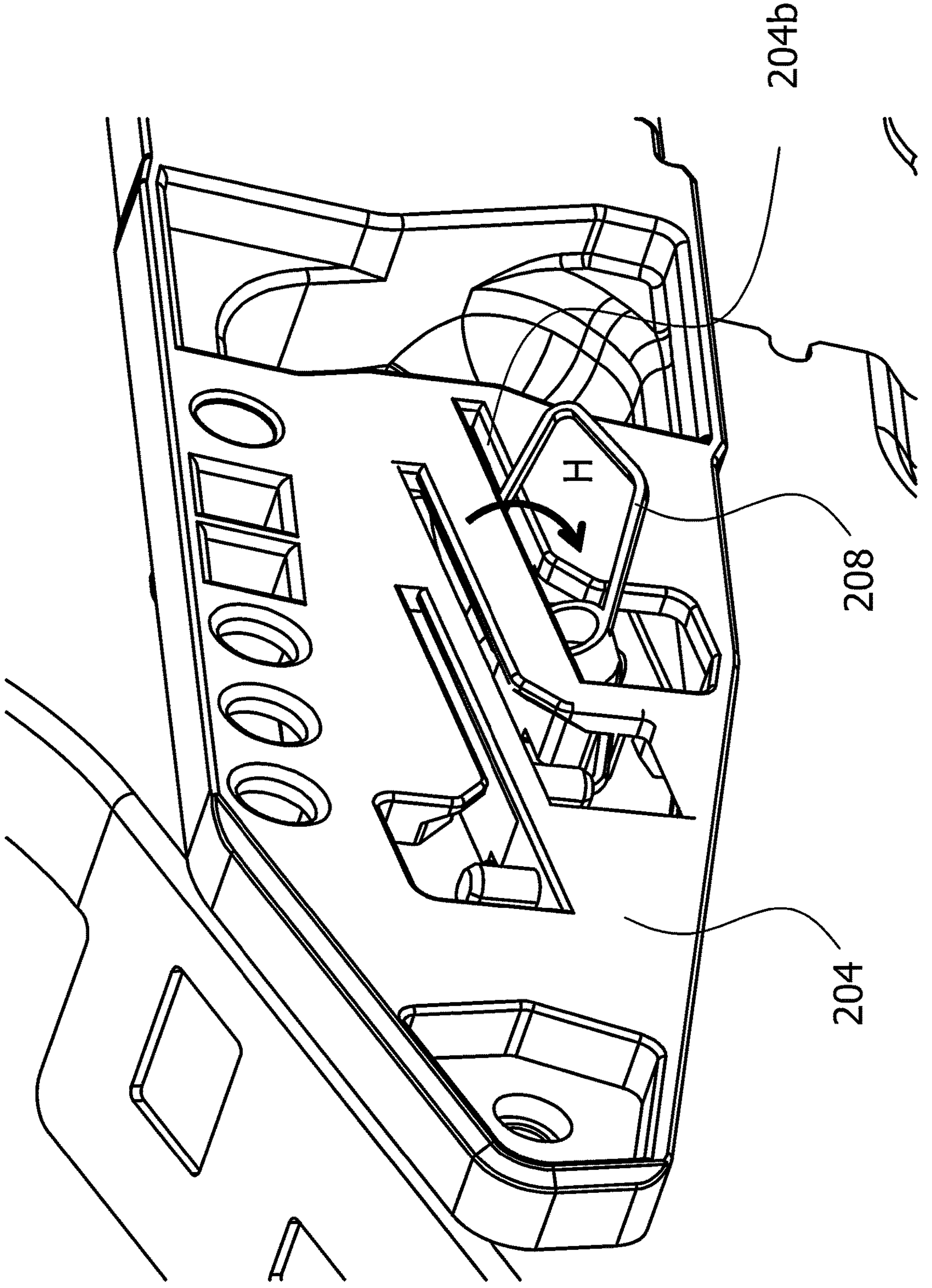

FIG. 28 is a perspective view showing a state in which the electrical contact portion of the apparatus main assembly using the torsion coil spring in the embodiment 1 is inclined.

Figure 29:
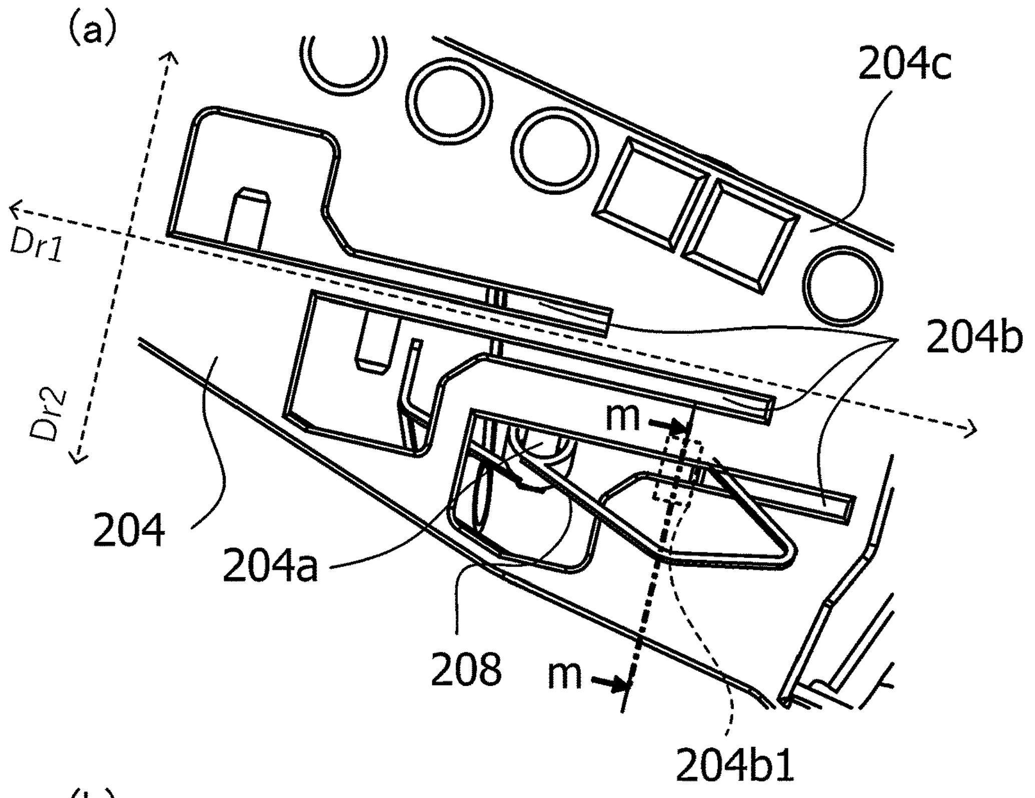
Figure 29:
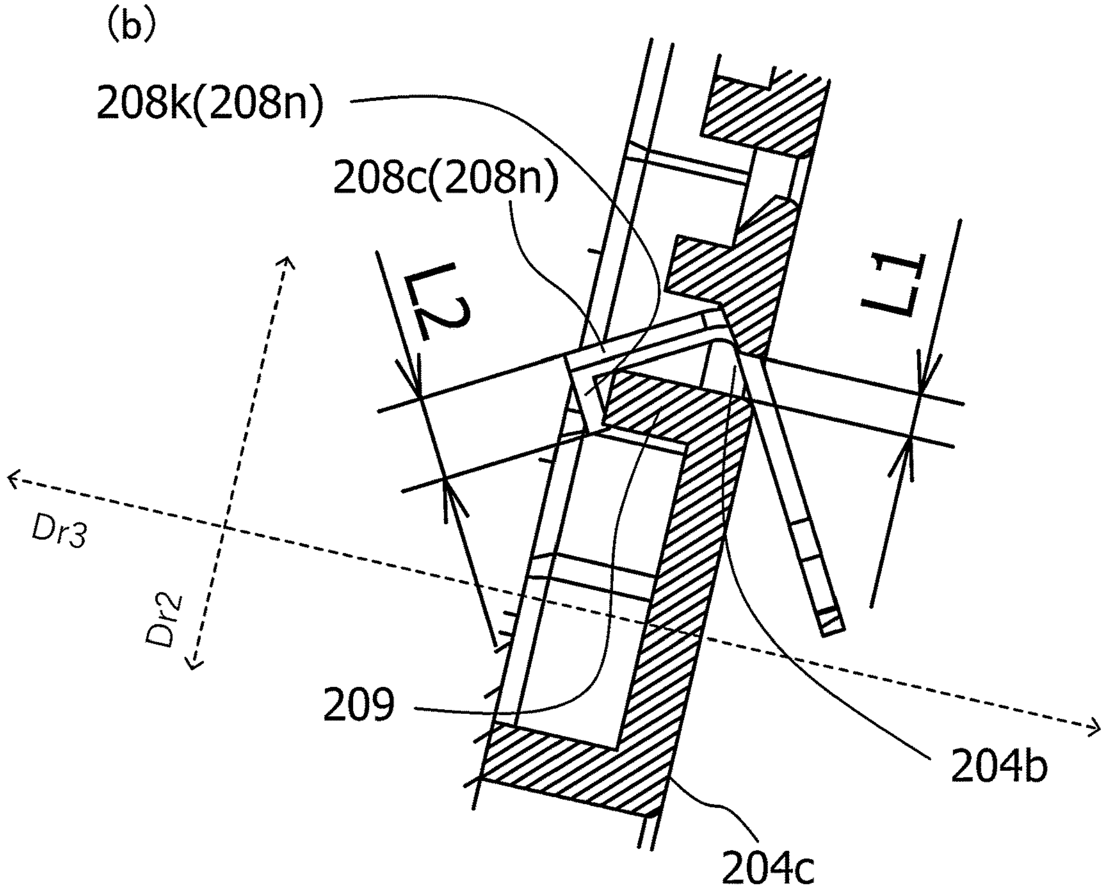

Part (a) of FIG. 29 is a sectional view showing the state in which the electrical contact portion of the apparatus main assembly using the torsion coil spring in the embodiment 1 is inclined, and part (b) of FIG. 29 is a sectional view taken along an m-m line of part (a) of FIG. 29.

Figure 30:
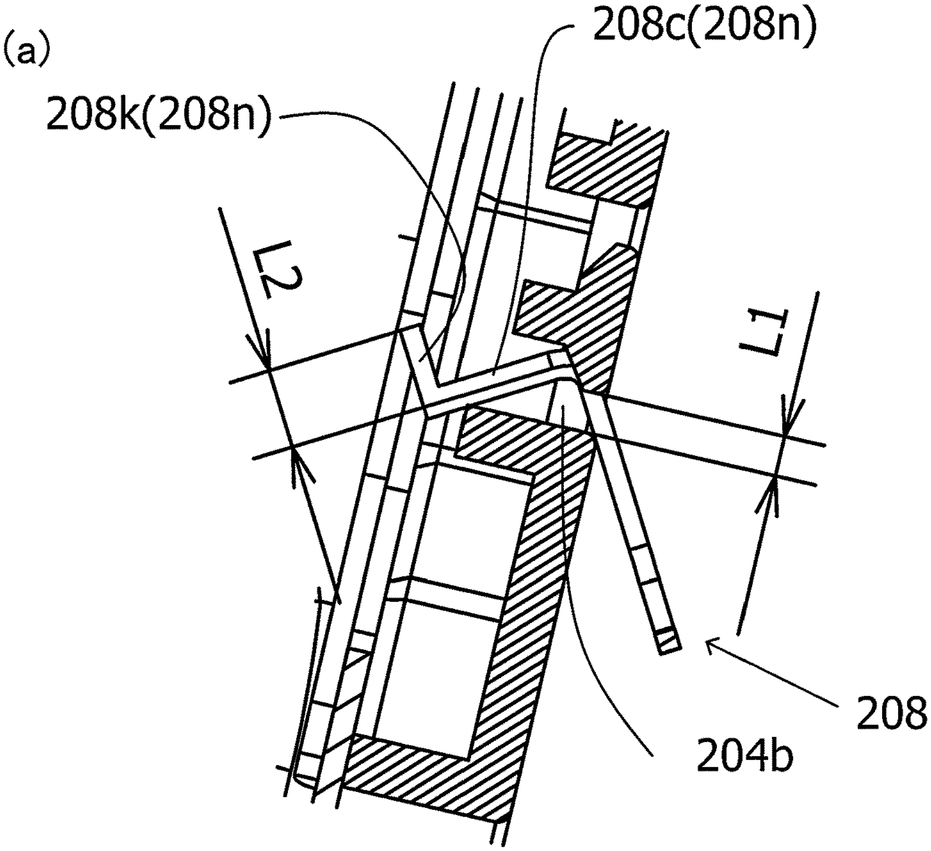
Figure 30:
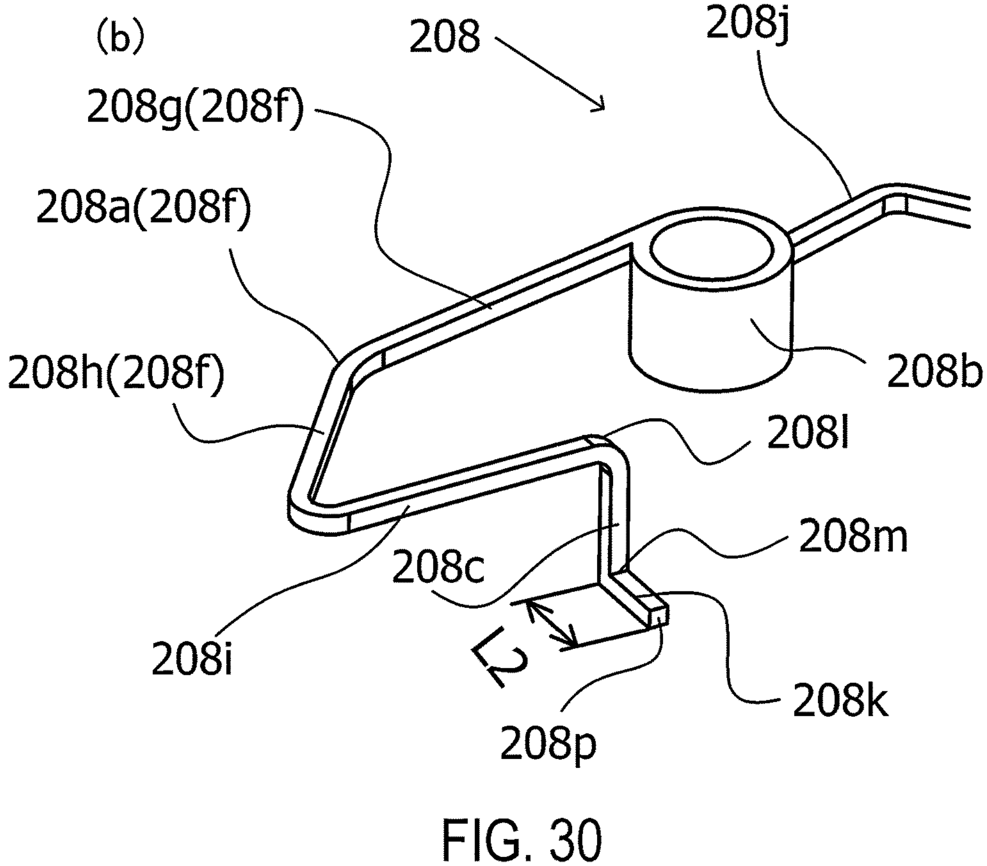

Part (a) of FIG. 30 is a sectional view showing a state in which an electrical contact portion of an apparatus main assembly using a torsion coil spring is inclined in an embodiment 2, and part (b) of FIG. 30 is a perspective view of an enlarged portion of the torsion coil spring.

Figure 31:
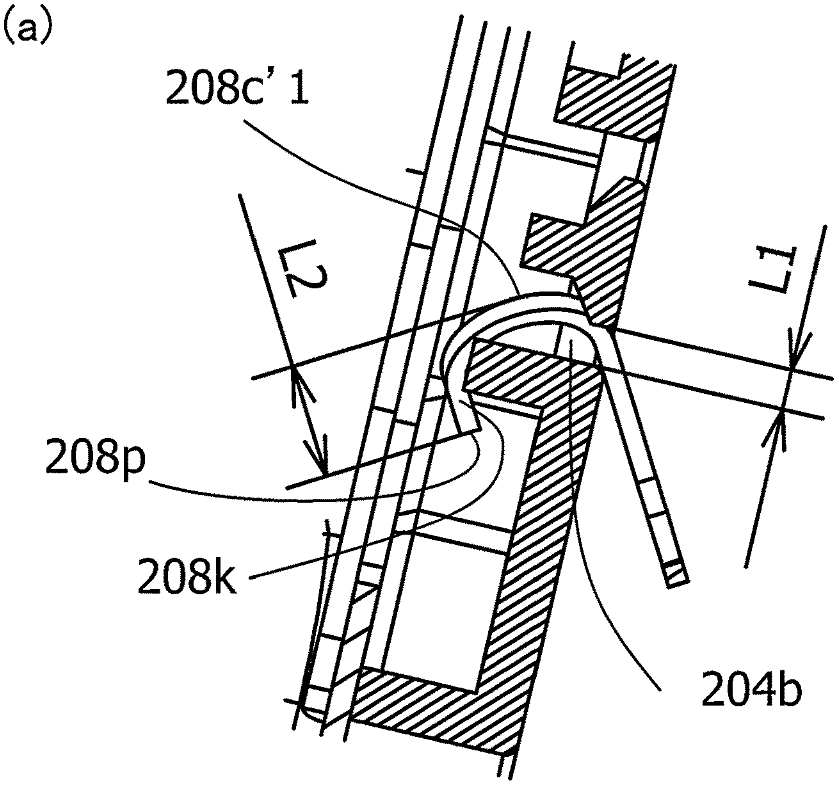
Figure 31:
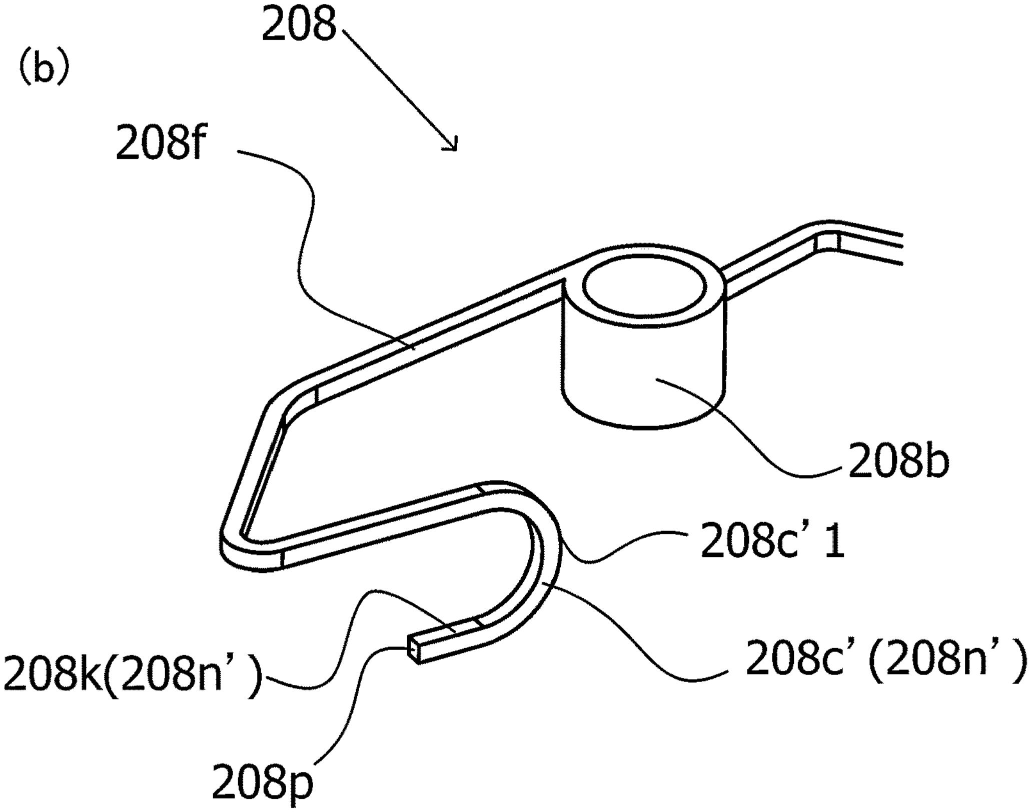

Part (a) of FIG. 31 is a sectional view showing a state in which an electrical contact portion of an apparatus main assembly using a torsion coil spring is inclined in an embodiment 3, and part (b) of FIG. 31 is a perspective view of an enlarged portion of the torsion coil spring.

DESCRIPTION OF THE EMBODIMENTS

Embodiments

Figure 1:
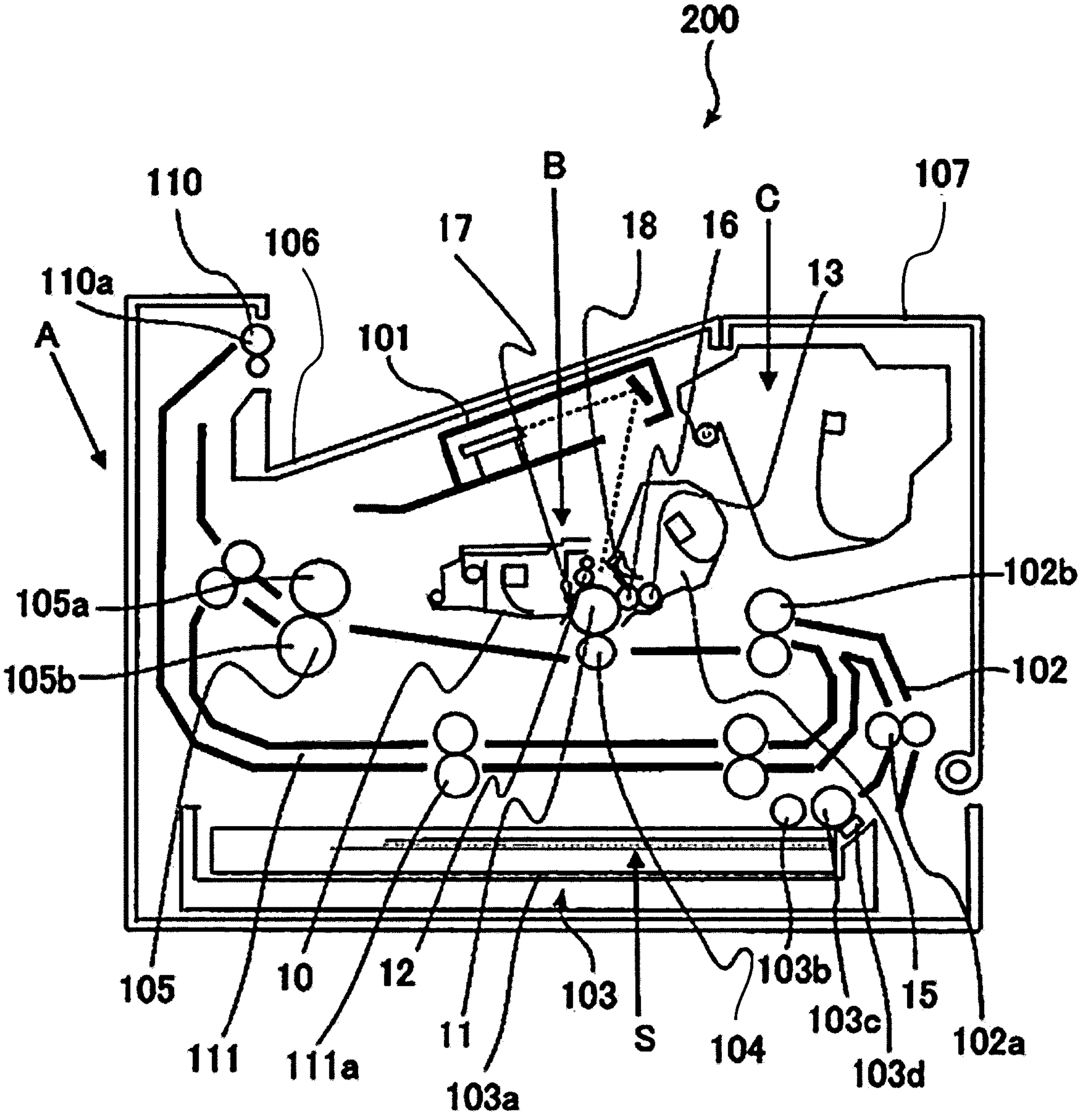
FIG. 1 is a schematic sectional view of an image forming apparatus according to an embodiment.

An embodiment will be described using FIG. 1 to part (c) of FIG. 18. First, a schematic structure of an image forming apparatus of this embodiment will be described using FIG. 1.

[Image Forming Apparatus]

An image forming apparatus 200 is a laser beam printer of an electrophotographic type. As shown in FIG. 1, the image forming apparatus 200 includes an apparatus main assembly (printer main assembly) A, a process cartridge B as an image forming portion, and a toner cartridge C. The apparatus main assembly A includes a laser scanner 101, a sheet conveying portion 102, a sheet feeding portion 103, a transfer roller 104, a fixing portion 105, a sheet discharging portion 110, a reverse conveying portion 111, and the like. Further, although described specifically later, in the apparatus main assembly A, the process cartridge B and the toner cartridge C are disposed detachably mountable to the apparatus main assembly A. For this purpose, the apparatus main assembly A is provided with an openable door 107.

The process cartridge B includes a cleaning unit 10, a photosensitive drum 11 which is an image bearing member and a photosensitive member, a charging roller 12 which is a charging member, a developing unit 15, and a cleaning blade 17 which is a cleaning member. Above the process cartridge B, the laser scanner 101 which is an exposure device is provided.

The charging roller 12 is disposed in contact with an outer peripheral surface of the photosensitive drum 11 and electrically charges the photosensitive drum 11 under application of a voltage from the apparatus main assembly A. Further, the charging roller 12 is rotated by rotation of the photosensitive drum 11. The developing unit 15 includes a developing roller 16 which is a developer carrying member for carrying and conveying toner which is a developer, and includes a supplying roller 13 and a developing blade 18. The developing roller 16 is provided opposed to the photosensitive drum 11.

The cleaning blade 17 is an elastic member disposed in contact with the outer peripheral surface of the photosensitive drum 11, and cleans the surface of the photosensitive drum 11. The cleaning blade 17 elastically contacts the photosensitive drum 11 at a free end thereof, and thus removes, from the photosensitive drum 11, toner remaining after a sheet S described later passes through between the photosensitive drum 11 and the transfer roller 104.

The sheet feeding portion 103 includes a cassette 103*a*, a pick-up roller 103*b*, a separation roller 103*c*, and a separation pad 103*d*. The pick-up roller 103*b* feeds an uppermost sheet accommodated in the cassette 103*a*. The separation roller 103*c* and the separation pad 103*d* separate the sheet S one by one fed by the pick-up roller 103*b*. The sheet conveying portion 102 includes a conveying roller pair 102*a* and a registration roller pair 102*b* which are used for conveying the sheet S fed from the sheet feeding portion 103. The registration roller pair 102*b* conveys the sheet S to a transfer portion between the photosensitive drum 11 and the transfer roller 104 in synchronism with a timing of a toner image formed on the photosensitive drum 11.

The fixing portion 105 includes a fixing roller 105*a* heated by a heating source such as a heater and a pressing roller 105*b* forming a fixing nip in which the sheet S is nipped between the fixing roller 105*a* and the pressing roller 105*b*. The sheet S on which the toner image is transferred in the transfer portion is conveyed to the fixing portion 105 and is heated and pressed in the fixing nip. By this, the toner image is fixed on the sheet S.

The sheet discharging portion 110 includes a discharging roller pair 110*a*, and the sheet S on which the toner image is fixed is discharged onto a discharge tray 106 by the discharging roller pair 110*a*. The reverse conveying portion 111 includes a reverse conveying roller 111*a*, and reverses front and back sides (surfaces) of the sheet S passed through the fixing portion 105 in the case where images are formed on both sides of the sheet S, and then conveys the sheet S toward the registration roller pair 102*b*.

Next, an operation of the image forming apparatus 200 will be described using FIG. 1. The photosensitive drum 11 rotationally driven by a driving source (motor) (not shown) is electrically charged uniformly to a predetermined potential by the charging roller 12. The surface of the photosensitive drum 11 after the charging is exposed to light on the basis of image information by the laser scanner 101, and an electric charge in an exposure portion is removed, so that an electrostatic latent image is formed. To the electrostatic latent image on the photosensitive drum 11, the toner is supplied from the developing roller 16, so that the electrostatic latent image is visualized as the toner image.

On the other hand, in parallel to such a toner image forming operation, the sheet S is fed from the sheet feeding portion 103. The sheet S fed from the sheet feeding portion 103 is conveyed to the transfer portion by the registration roller pair 102*b* while being timed to formation of the toner image on the photosensitive drum 11. When the sheet S passes through the transfer portion, a voltage is applied from the apparatus main assembly A to the transfer roller 104, so that the toner image on the photosensitive drum 11 is transferred as an unfixed image onto the sheet S. Thereafter, the sheet S on which the toner image is transferred is conveyed to the fixing portion 105, so that the unfixed image is heated and pressed, and thus is fixed on the surface of the sheet S. The sheet S on which the toner image is fixed is discharged and stacked on the discharge tray 106 by the sheet discharging portion 110. Incidentally, in the case where the images are formed on both sides of the sheet S, the sheet S is conveyed to the reverse conveying portion 111, and the toner image is formed on the back side of the sheet S similarly as described above.

[Process Cartridge]

The process cartridge B will be described using FIGS. 2 to 5. Part (a) of FIG. 2 is a front view of the process cartridge B, part (b) of FIG. 2 is a sectional view of the process cartridge B taken along an a-a line of part (a) of FIG. 2, and part (a) of FIG. 3 is a sectional view of the process cartridge B taken along a b-b line of part (a) of FIG. 2. As shown in part (a) of FIG. 2 to part (a) of FIG. 3, the process cartridge B includes the cleaning unit (unit, drum unit) 10 and the developing unit (unit) 15. The cleaning unit 10 includes the photosensitive drum 11, the cleaning blade 17, and the like. The developing unit 15 includes the developing roller 16. The process cartridge B is constituted by the cleaning unit 10 provided with the cleaning blade 17 and the like and the developing unit 15 provided with the developing roller 16. The cleaning unit 10 includes the photosensitive drum 11, the cleaning blade 17, the charging roller 12, a charging roller cleaner 14 which is a cleaning member for the charging roller 12, a residual toner primary accommodating portion 10*a*, a first residual toner conveying passage 10*b*, and a second residual toner conveying passage 10*c*. Toner (residual toner) removed from the photosensitive drum 11 by the cleaning blade 17 is conveyed from the residual toner primary accommodating portion 10*a* to the toner cartridge C through the first residual toner conveying passage 10*b* and the second residual toner conveying passage 10*c*.

Part (b) of FIG. 3 is a sectional view of the process cartridge B taken along a c-c line of part (a) of FIG. 2. As shown in part (b) of FIG. 3, the developing unit 15 includes the developing roller 16, the supplying roller 13, the developing blade 18, a developing chamber 151, a developer accommodating chamber 152, and a toner receiving chamber 153 for receiving the toner supplied from the toner cartridge C. In the developing chamber 151, the developing roller 16 is disposed. The developer accommodating chamber 152 supplies the toner to the developing chamber 151. The toner receiving chamber 153 receives the toner supplied from the toner cartridge C.

The developing roller 16 rotates while carrying the toner and supplies the toner to a developing region. Then, the developing roller 16 develops the electrostatic latent image, with the toner, formed on the photosensitive drum 11. The supplying roller 13 supplies the toner in the developing chamber 151 to the developing roller 16. Such a supplying roller 13 is disposed so that a rotational axis direction thereof is parallel to a rotational axis direction of the developing roller 16, and on an outer peripheral surface thereof, an elastic layer such as a sponge or the like is formed so that the developer is easily conveyed. The developing blade 18 contacts a peripheral surface of the developing roller 16 and regulates a layer thickness (amount) of the toner deposited (carried) on the peripheral surface of the developing roller 16. Further, the developing blade 18 imparts an electric charge charged by friction with the toner (triboelectric charge) to the toner.

The developer accommodating chamber 152 communicates with the developing chamber 151 and accommodates the toner supplied to the developing chamber 151. The toner accommodated in the developer accommodating chamber 152 is sent to the developing chamber 151 by rotation of a stirring member 154 and then is supplied to the developing roller 16. A remaining amount of the toner in the developer accommodating chamber 152 is detected by a remaining amount detecting portion (not shown). Then, when the amount of the toner in the developer accommodating chamber 152 becomes a certain amount or less, the toner is supplied from the toner cartridge C to the process cartridge B.

The toner receiving chamber 153 communicates with the developer accommodating chamber 152, and supplies the toner, supplied from the toner cartridge C, to the developer accommodating chamber 152.

Supply of the toner from the toner cartridge C to the developing unit 15 of the process cartridge B is made through a supply opening 21*c* of a stay 21, the toner receiving chamber 153, and a delivery opening 21*d*, so that the toner is accommodated in the developer accommodating chamber 152.

Next, the constitution of the process cartridge B will be described more specifically using part (b) of FIG. 2, parts (a) and (b) of FIG. 4, and parts (a) and (b) of FIG. 5. Part (a) of FIG. 4 is an exploded perspective view of the process cartridge B, and part (b) of FIG. 4 is an exploded perspective view of the process cartridge B as viewed from a direction different from a direction in part (a). Part (a) of FIG. 5 is a side view of the process cartridge B showing a contact state of the developing unit 15 to the photosensitive drum 11, and part (b) of FIG. 5 is a side view of the process cartridge B showing a separated state of the developing unit 15 from the photosensitive drum 11.

As described above, the cleaning unit 10 includes the photosensitive drum 11, the charging roller 12, and the cleaning blade 17. The developing unit 15 includes the developing roller 16, the developing blade 18, the developing chamber 151, the developer accommodating chamber 152, and the toner receiving chamber 153.

As shown in parts (a) and (b) of FIG. 4, the cleaning unit 10 is constituted by a cleaning frame 20, the stay 21, and a side cover 7. The cleaning frame 20 supports the cleaning blade 17, the charging roller 12, and the charging roller cleaner 14. As shown in part (b) of FIG. 4, the photosensitive drum 11 is rotatably supported by a drum pin 22 mounted on the cleaning frame 20 on one side and by a photosensitive drum supporting portion 7*b* provided on the side cover 7 on the other side (opposite side).

Further, as shown in parts (a) and (b) of FIG. 4, at an end portion of the developing roller 16 with respect to an axial direction, bearing members 4 and 5 are disposed, and the developing unit 15 is connected to the cleaning unit 10 so as to be rotatable about a swing axis 8 defined by a rectilinear line including supporting axes 8*a* and 8*b*. The swing axis 8 is disposed substantially parallel to a rotational axis 11*b* of the photosensitive drum 11.

A constitution in which the developing unit 15 is supported by the cleaning unit 10 will be specifically described. As shown in part (a) of FIG. 4, a cylindrical shape portion 5*a* provided on the bearing member 5 is supported by a cylindrical hole portion 7*a* provided in the side cover 7. The supporting axis 8*b* is defined by a common axis to the cylindrical hole portion 7*a* of the side cover 7 and the cylindrical shape portion 5*a* of the bearing member 5. Further, at a rotation center of the cylindrical shape portion 5*a* of the bearing member 5, a developing coupling 155 which is a drive input member for receiving drive from the apparatus main assembly A is provided.

Further, as shown in part (b) of FIG. 4, a pin 6 is inserted so as to extend over a cylindrical hole portion 20*a* of the cleaning frame 20 of the cleaning unit 10 and the cylindrical hole portion 4*a* of the bearing member 4. The supporting axis 8*b* is defined by a common axis to the pin 6 and the cylindrical hole portion 4*a* of the bearing member 4. The supporting axes 8*a* and 8*b* are disposed coaxially with each other, and as described above, the swing axis 8 is defined by a rectilinear line including the supporting axes 8*a* and 8*b*.

As described above, the developing unit 15 is supported rotatably about the swing axis 8 relative to the cleaning unit 10. Further, the developing unit 15 is urged toward the photosensitive drum 11 of the cleaning unit 10 by pressing springs 19*a* and 19*b* which are elastic members, so that the developing roller 16 is contacted to the photosensitive drum 11.

Next, a contact and separation operation of the developing unit 15 relative to the cleaning unit 10 will be described using parts (a) and (b) of FIG. 5. Incidentally, parts (a) and (b) of FIG. 5 are illustrations in which the side cover 7 is omitted for illustrating a separation mechanism 100 of the apparatus main assembly A. As shown in part (a) of FIG. 5, a projected portion 5*b* is provided in a position where the bearing member 5 opposes the separation mechanism 100. In this embodiment, in a state in which the process cartridge B is mounted in the apparatus main assembly A, the separation mechanism 100 is provided below the developing unit 15. Further, the projected portion 5*b* is provided at a lower end portion of the bearing member 5. The separation mechanism 100 is provided in the apparatus main assembly A and is swingable substantially in up-down direction about a swing axis 100*a* as a center by a driving source such as a motor (not shown).

As shown in part (a) of FIG. 5, in a position where the projected portion 5*b* does not contact the separation mechanism 100, the developing roller 16 is contacted to the photosensitive drum 11 by an urging force of the pressing springs 19*a* and 19*b*.

This position is an image forming position where the electrostatic latent image formed on the surface of the photosensitive drum 11 is capable of being developed by the developing roller 16.

As shown in part (b) of FIG. 5, the separation mechanism 100 provided in the apparatus main assembly A swings about the swing axis 100*a* and contacts the projected portion 5*b*, and the projected portion 5*b* receives a force from the separation mechanism 100, so that the developing unit 15 is rotated about the swing axis 8 as a rotation center in an arrow R2 direction. By this, the developing roller 16 is separated from the photosensitive drum 11 against the urging force of the pressing springs 19*a* and 19*b*. This position is a non-image forming position retracted from the image forming position.

When the separation mechanism 100 returns from the position of part (b) of FIG. 5 to the position of part (a) of FIG. 5 which is an original position, the separation mechanism 100 is separated from the projected portion 5*b*. Then, by the urging force of the pressing springs 19*a* and 19*b*, the developing roller 16 is contacted to the photosensitive drum 11 again. Thus, in this embodiment, the position of the developing unit 15 is capable of being switched between a contact position (image forming position) and a separated position (non-image forming position) by the separation mechanism 100. That is, an attitude of the developing unit 15 in the process cartridge B is switchable between the contact position and the separated position relative to the photosensitive drum 11. By this, it is possible to suppress toner deterioration and unnecessary toner consumption during non-image formation.

As described above, the developing unit 15 has a constitution in which the developing unit 15 rotates about the swing axis 8 and thus moves between the contact position and the separated position. For that reason, when the developing unit 15 moves between the contact position and the separated position relative to the cleaning unit 10, a positional change of the developing coupling 155 can be suppressed to a minute level which is a degree of engagement play (backlash). Specifically, the cylindrical shape portion 5*a* of the bearing member 5 engages with the cylindrical hole portion 7*a* of the side cover 7 (part (a) of FIG. 4). However, the cylindrical shape portion 5*a* of the bearing member 5 and the cylindrical hole portion 7*a* of the side cover 7 engage with each other with engagement play of 0.13 mm or less. Therefore, the position of the developing coupling 155 when the developing unit 15 moves between the contact position and the separated position does not change in a degree corresponding to the engagement play or more.

[Toner Cartridge]

Next, the toner cartridge C will be described using FIGS. 6 and 7. Part (a) of FIG. 6 is a front view of the toner cartridge C, part (b) of FIG. 6 is a sectional view of the toner cartridge C taken along a d-d line of part (a) of FIG. 6, and part (c) of FIG. 6 is a sectional view of the toner cartridge C taken along an e-e line of part (a) of FIG. 6. Part (a) of FIG. 7 is an exploded perspective view of the toner cartridge C, and part (b) of FIG. 7 is an exploded perspective view of the toner cartridge C as viewed from a direction different from a direction in part (a) of FIG. 7.

As shown in part (a) of FIG. 6, the toner cartridge C includes a toner supplying unit 30 and a residual toner accommodating unit 40. The toner cartridge C is detachably mountable together with the process cartridge B to the apparatus main assembly A and is also detachably mountable to the process cartridge B. The toner supplying unit 30 is capable of supplying the toner to the process cartridge B. The residual toner accommodating unit 40 is capable of accommodating the residual toner collected by the process cartridge B.

[Toner Supplying Unit]

The toner supplying unit 30 includes, as shown in part (b) of FIG. 6, a toner supplying container 31 which is a first accommodating container and a toner discharge opening 31*a* for permitting discharge of the toner from the toner supplying container 31 to an outside. The toner supplying container 31 is formed by a supplying portion frame 32*a* including the toner accommodating portion 30*a* and by a supplying portion cover 32*b*. Further, the supplying portion frame 32*a* is provided with the toner discharge opening 31*a* through which the toner is discharged from the toner accommodating portion 30*a*. Further, a shutter member 34 capable of opening and closing the toner discharge opening 31*a* is provided. The shutter member 34 is rotated in an arrow R1 direction in interrelation with a mounting and dismounting operation of the toner cartridge C relative to the process cartridge B, so that the shutter member 34 opens and closes the toner discharge opening 31*a*. The shutter member 34 is disposed outside the supplying portion frame 32*a*.

Further, the toner accommodating portion 30*a* includes, as a toner conveying member for conveying the toner to the toner discharge opening 31*a*, a screw member 35 for conveying the toner toward the toner discharge opening 31*a*. Further, the toner accommodating portion 30*a* includes a stirring and conveying unit 36 for conveying the toner toward the screw member 35.

Further, as shown in parts (a) and (b) of FIG. 7, the toner conveyed to the toner discharge opening 31*a* is discharged to an outside of the toner discharge opening 31*a* by a volume fluctuation of a pump 37*a* provided in a pump unit 37. The pump unit 37 is constituted by the pump 37*a* changing in volume by expansion and contraction, a cam 37*b* expanding and contracting the pump 37*a* by rotation thereof, and a link arm 37*c*. Further, as shown in FIG. 5 and parts (a) and (b) of FIG. 7, the toner supplying unit 30 includes a stirring drive input portion 38 and a pump/screw drive input portion 39. The stirring drive input portion 38 functions as a toner conveying and driving portion for driving the toner conveying member, and drives the stirring and conveying unit 36. The pump/screw drive input portion 39 drives the pump unit 37 and the screw member 35. The pump/screw drive input portion 39 is provided with a pump/screw coupling portion 39*a* which is a projection shape portion to which a rotational driving force is inputted from the apparatus main assembly A. This rotational driving force is converted into reciprocating motion by the cam 37*b* and the link arm 37*c*. Then, by using this reciprocating motion, a bellow-shaped portion of the pump 37*a* is expanded and contracted, so that a volume fluctuation is made.

[Residual Toner Accommodating Unit]

As shown in part (c) of FIG. 6, the residual toner accommodating unit 40 includes a residual toner receiving opening 42 for receiving the residual toner from the process cartridge B, and a residual toner accommodating container 41 which is a second accommodating container in which the residual toner received through the residual toner receiving opening 42 is accommodated.

The residual toner accommodating container 41 is formed by a residual toner accommodating portion frame 41*a* including the residual toner accommodating portion 40*a* and by a residual toner accommodating cover 41*b*. The residual toner accommodating cover 41*b* is provided with a residual toner receiving opening 42 for receiving the residual toner collected from the process cartridge B. The residual toner accommodating cover 41*b* includes a residual toner shutter member 43 for opening and closing the residual toner receiving opening 42. The residual toner shutter member 43 is opened and closed in an arrow R3 direction of part (c) of FIG. 6 in interrelation with the mounting and demounting of the toner cartridge C relative to the apparatus main assembly A.

As shown in part (c) of FIG. 6 and part (a) of FIG. 7, in the residual toner accommodating unit 40, a partition member 46 and a first residual toner accommodating screw 44 and a second residual toner accommodating screw 45 which are as a residual toner feeding member for feeding the residual toner in the residual toner accommodating portion 40*a*. The partition member 46 partitions a space in the residual toner accommodating unit 40 into a plurality of accommodating portions. The first residual toner accommodating screw 44 conveys the residual toner, dropped through the residual toner receiving opening 42, in a longitudinal direction of the toner cartridge C (direction perpendicular to the drawing sheet of FIG. 6). The second residual toner accommodating screw 45 receives drive from the first residual toner accommodating screw 44 and conveys the residual toner, conveyed by the first residual toner accommodating screw 44, obliquely upward.

As shown in parts (a) and (b) of FIG. 7, a driving force inputted from the above-described stirring drive input portion 38 is transmitted to a non-driving side of the toner supplying unit 30 via the stirring and conveying unit 36, and thus is conveyed to a stirring member non-driving side gear 38*a*. By the stirring member non-driving side gear 38*a* and a residual toner accommodating portion gear train 47, drive is transmitted to the first residual toner accommodating screw 44. To the toner supplying unit 30 side and the residual toner accommodating unit 40 side, a driving-side toner cartridge side cover 50 and a non-driving-side toner cartridge side cover 60 are mounted, respectively.

By the above-described constitution, even when the pump/screw drive input portion 39 is not driven, the stirring drive input portion 38 can be driven. That is, even when the toner supplying unit 30 does not supply the toner to the process cartridge B, a residual toner collectable state can be maintained by driving the first residual toner accommodating screw 44 and the second residual toner accommodating screw 45 in the residual toner accommodating unit 40.

Further, the drive from the apparatus main assembly A can be inputted to one end of the toner cartridge C, so that a gear train of the apparatus main assembly A can be simplified. Further, by using the stirring and conveying unit 36, the drive is transmitted from one end of the other end of the supplying portion frame 32, so that the drive can be transmitted to the residual toner accommodating unit 40 without increasing the number of parts for drive transmission. By this, the residual toner can be accommodated in the toner cartridge C while suppressing upsizing of the toner cartridge C and the apparatus main assembly A in the rotational axis direction due to driving means for the toner cartridge C.

[Mounting and Dismounting Method of Process Cartridge B and Toner Cartridge C]

Then, a mounting and dismounting method of the process cartridge B and the toner cartridge C into and from the apparatus main assembly A will be described using FIGS. 4, 7, 8, 9, 10, and 11. Part (a) of FIG. 8 is a schematic view showing an inserting state of the process cartridge B into the apparatus main assembly A, and part (b) of FIG. 8 is a schematic perspective view showing an inserting state of the toner cartridge C into the apparatus main assembly A. Part (a) of FIG. 9 is a schematic side view showing the inserting state of the process cartridge B into the apparatus main assembly A, and part (b) of FIG. 9 is a schematic side view showing the inserting state of the toner cartridge C into the apparatus main assembly A. Part (c) of FIG. 9 is a schematic side view showing a mounted state of the process cartridge B and the toner cartridge C into the apparatus main assembly A. FIG. 10 is a side view of the process cartridge B, and FIG. 11 is a side view of the process cartridge B as viewed from a side opposite from a side in FIG. 10.

As shown in part (a) of FIG. 8, an inside space of the apparatus main assembly A is a mounting portion for the process cartridge B and the toner cartridge C. The openable door 107 is provided so as to be rotatable in an arrow R5 direction about a rotational axis 107*a* relative to the apparatus main assembly A (see parts (a) to (c) of FIG. 9). Parts (a) and (b) of FIG. 18 are schematic view showing a state in which the openable door 107 is open.

Further, the apparatus main assembly A includes guiding portions 108 and 109. The guiding portions 108 and 109 are provided along a mounting direction D (mounting and dismounting direction) of the process cartridge B and the toner cartridge C, on opposite sides, respectively, with respect to the longitudinal direction of the process cartridge B and the toner cartridge C in a mounted state. The process cartridge B is, as shown in FIGS. 4, 10, and 11, provided with upper bosses 93 and 94 and lower bosses 95 and 96 on opposite sides, respectively, with respect to the longitudinal direction, and on a side downstream of the upper bosses 93 and 94, end bosses 97 and 98 are provided, respectively.

The mounting of the process cartridge B and the toner cartridge C into the apparatus main assembly A is performed from the process cartridge B. First, when the process cartridge B is mounted into the apparatus main assembly A, as shown in part (a) of FIG. 8 and part (a) of FIG. 9, the upper boss 93 and the end boss 98 ride on the guiding portion 108 and sandwich the guiding portion 108 in cooperation with the lower boss 96. Similarly, on the opposite side with respect to the longitudinal direction, the upper boss 93 and the end boss 97 ride on the guiding portion 109 and sandwich the guiding portion 109 in cooperation with the lower boss 95. Thus, the process cartridge B is inserted while sandwiching the guiding portions 108 and 109 by the upper bosses 93 and 94, the end bosses 97 and 98, and the lower bosses 95 and 96. By this, the process cartridge B is guided to the mounting portion inside the apparatus main assembly A along the guiding portions 108 and 109.

This will be described more specifically. The mounting direction D of the process cartridge B is, as shown in FIG. 10, a direction of a line L3 connecting a lower end of the end boss 97 and a lower end of the upper boss 93. When a user mounts the process cartridge B in the apparatus main assembly A with the end boss 97 (98) as a starting point in a raised attitude, the lower boss 96 (95) abuts on the guiding portion 108 (109), so that the attitude of the process cartridge B is restricted. A deviation amount between a direction at this time and the mounting direction D is a degree corresponding to play between the guiding portion 108 (109) and the lower boss 96 (95).

When the user mounts the process cartridge B with the upper boss 94 (93) as a starting point in a raised attitude, the lower boss 96 (95) abuts on the guiding portion 108 (109), so that the attitude of the process cartridge B is restricted. A deviation amount between a direction at this time and the mounting direction D is a degree corresponding to play between the guiding portion 108 (109) and the lower boss 96 (95).

As described above, the mounting direction D has some angle width depending on a mounting method of the user. In this embodiment, as another manner of expression of the mounting direction D, the mounting direction D is defined as follows. That is, the mounting direction D is defined as a direction (line L4) in which in a state that the photosensitive drum 11 and the developing roller 16 are in contact with each other, an angle $\alpha$ formed between the direction (line LA) and a line (first virtual line L1) connecting axial centers of the photosensitive drum 11 and the developing roller 16 is 3.8°±5°.

The toner cartridge C is provided with positioning bosses 50*a* and 60*a* on a front side (downstream side) with respect to the mounting direction D and on opposite sides with respect to the longitudinal direction as shown in parts (a) and (b) of FIG. 7. Further, the toner cartridge C is provided with portions-to-be-guided 50*b* and 60*b* on a rear side (upstream side) with respect to the mounting direction D than the positioning bosses 50*a* and 60*a* and on opposite sides with respect to the longitudinal direction. The positioning boss 50*a* and the portion-to-be-guided 50*b* are provided on an outside end surface of the driving-side toner cartridge side cover 50 with respect to the axial direction. The positioning boss 60*a* and the portion-to-be-guided 60*b* are provided on an outside end surface of the non-driving-side toner cartridge side cover 60 with respect to the axial direction. The process cartridge B is provided with toner cartridge positioning portions 21*a* and 21*b* on the stay 21 as shown in parts (a) and (b) of FIG. 4.

As shown in part (b) of FIG. 8 and part (b) of FIG. 9, when the toner cartridge C is mounted into the apparatus main assembly A, the portions-to-be-guided 50*b* and 60*b* are placed on the guiding portions 108 and 109, respectively, and are mounted in the mounting direction D. As shown in part (c) of FIG. 9, when the toner cartridge C is mounted to a mounting completion position, the positioning bosses 50*a* and 60*a* of the toner cartridge C enter the toner cartridge positioning portions 21*a* and 21*b*, respectively, of the process cartridge B. At this time, leading end sides of the portions-to-be-guided 50*b* and 60*b* with respect to the mounting direction D are separated from the guiding portions 108 and 109, and trailing ends thereof are in a contact state with the guiding portions 108 and 109. By this, the toner cartridge C is positioned to the process cartridge B. Further, the trailing ends of the portions-to-be-guided 50*b* and 60*b* contact the guiding portions 108 and 109, so that a position of the toner cartridge C in the apparatus main assembly A is determined.

When the openable door 107 is closed after the process cartridge B and the toner cartridge C are mounted, the image forming apparatus 200 is in a state in which the image is capable of being formed. When the toner cartridge C and the process cartridge B are dismounted, a procedure reveres to the above-described procedure is performed. Incidentally, as shown in FIG. 10, the process cartridge B is provided with a hole portion 210.

[Charging Contact Constitution of Process Cartridge]

Next, details of a charging contact constitution of the process cartridge B in this embodiment will be described using FIGS. 12 to 16. FIG. 12 is a perspective view of a periphery of an electrode member of the process cartridge B, and FIG. 13 is an exploded perspective view showing an extracted part of a structure of the periphery of the electrode member of the process cartridge B. Part (a) of FIG. 14 is a perspective view of the extracted part of the structure of the periphery of the electrode member of the process cartridge as viewed from a charging roller side in the embodiment, and part (b) of FIG. 14 is a perspective view of the extracted part of the structure of the periphery of the electrode member of the process cartridge B as viewed from an electrode member side. Part (a) of FIG. 15 is a front view showing a relationship between the electrode member of the process cartridge B and a spring contact of the apparatus main assembly A in the embodiment, part (b) of FIG. 15 is a sectional view taken along an f-f line of part (a) of FIG. 15, and part (c) of FIG. 15 is a sectional view taken along a g-g line of part (a) of FIG. 15.

FIG. 16 is a sectional view for illustrating a range in which diffusion of a spark in the electrode member is capable of being restricted (hereinafter, this range is referred to as a restricting range). FIG. 16 also shows a gravitational direction G.

As shown in FIGS. 12 and 13, the cleaning unit 10 is provided with the cleaning frame 20 which is a frame and with the charging roller 12 which is the process member and the charging member. The process member is a member used in image formation, and the charging roller 12 is a rotatable member which is rotatably supported by the cleaning frame 20 and which is used in the image formation. Further, the cleaning frame 20 is constituted by a resin material, and in this embodiment, the cleaning frame 20 is constituted by a resin material of which grade of flame retardancy in UL94 standard is HB.

As shown in FIG. 13 and part (a) of FIG. 14, a charging roller bearing 61 is connected to the cleaning frame 20 via a charging roller bearing spring 910, so that the charging roller 12 is rotatably supported by the cleaning frame 20 via the charging roller bearing 61. The charging roller 12 uniformly charges the surface of the photosensitive drum 11 by rotation thereof while being supplied with a predetermined voltage.

As shown in FIG. 12 and part (b) of FIG. 14, in order to impart the predetermined voltage to the charging roller 12, the cleaning unit 10 includes an electrode plate 901 which is an electrode member made of metal. The electrode plate 901 includes, as shown in parts (a) to (c) of FIG. 15, an electroconductive connecting portion 901*b* (see FIG. 12) electrically connected to the charging roller 12. In addition, the electrode plate 901 includes a contact point portion (contact portion) 901*a* which is an electrical contact portion electrically connected to a spring contact 911 which is a main assembly-side electrode member provided on the apparatus main assembly A side.

The contact portion 901*a* is provided so as to be exposed to an outside of the cleaning frame 20 with respect to the rotational axis direction of the charging roller 12. On the other hand, the electroconductive connecting portion 901*b* is inserted into the cleaning frame 20 and contacts the charging roller bearing spring 910. Then, as shown in parts (a) to (c) of FIG. 15, the contact portion 901*a* contacts the spring contact 911 which is an energizing member provided in the apparatus main assembly A. By the above-described constitution, the apparatus main assembly A is electrically connected to the charging roller 12 via the spring contact 911, the electrode plate 901, the charging roller bearing spring 910, and the charging roller bearing 61. Incidentally, the rotational axis direction of the charging roller 12 is substantially parallel to the longitudinal direction of the process cartridge B.

(Electrode Plate 901)

Then, the electrode plate 901 will be further specifically described. As shown in FIGS. 12 and 15, the contact portion 901*a* of the electrode plate 901 includes a bottom (surface) 901*c* which is an electrical contact surface, an inner wall surface 901*d* which is a connecting surface provided at a periphery of the bottom 901*c*, and an outermost surface which is a second surface. The outermost surface 901*f* is a surface positioned on an outermost side when the electrode plate 901 is mounted on the cleaning frame 20. The bottom 901*c* is a single flat surface provided at a position lower than the outermost surface 901*f* by one stage with respect to a normal direction to the bottom 901*c* (see parts (b) and (c) of FIG. 15).

That is, the outermost surface 901*f* is positioned on an outer side of the cleaning frame 20 than the bottom 901*c* with respect to the normal direction of the bottom 901*c*. In this embodiment, the outermost surface 901*f* is positioned on an outer side of the cleaning frame 20 than the bottom 901*c* with respect to the rotational axis direction of the charging roller 12. Further, the bottom 901*c* and the outermost surface 901*f* are formed substantially parallel to each other, and are disposed so as to face the outside of the cleaning frame 20 with respect to the rotational axis direction of the charging roller 12. Further, the bottom 901*c* is provided so that an angle of the bottom 901*c* falls within a range of −45° or more and +45° or less with respect to the gravitational direction in a state in which the process cartridge B is mounted in the apparatus main assembly A. The bottom 901*c* is provided so that the angle of the bottom 901*c* may preferably fall within a range of −30° or more and +30° or less, more preferably −10° or more and +10° or less, with respect to the gravitational direction. In this embodiment, the bottom 901*c* is provided parallel to the gravitational direction. Incidentally, the outermost surface 901*f* may only be required to be positioned on the outer side of the cleaning frame 20 than the bottom 901*c*, and may also be not parallel to the bottom 901*c*.

(Spring Contact 911)

The spring contact 911 provided on the apparatus main assembly A side is disposed so as to enter toward the bottom 901c from a position opposing the electrode plate 901. Specifically, the spring contact 911 is formed by bending a bar-like member made of metal. This bent portion passes through a level of the outermost surface 901f from the outside of the cleaning frame 20 and enters toward the bottom 901c, and thus becomes contactable to a part of the bottom 901c without contacting the outermost surface 901f. In this embodiment, the spring contact 911 is constituted so as to enter toward the bottom 901c side in a direction from the outside toward the inside of the cleaning frame 20 with respect to the rotational axis direction of the charging roller 12.

The inner wall surface 901d of the contact portion 901a of the electrode plate 901 is an inclined surface provided so as to connect the outermost surface 901f and the bottom 901c, and is inclined with respect to the normal direction to the bottom 901c. An inside peripheral edge portion (inner peripheral edge portion) of the outermost surface 901f on the bottom 901c side is positioned outside an outer peripheral edge portion of the bottom 901c. The inner wall surface 901d is the inclined surface connecting the outer peripheral edge portion of the bottom 901c and the inner peripheral edge portion of the outermost surface 901f, and an inclination direction is a direction in which the inner wall surface 901d is away from the bottom 901c toward the outermost surface 901f from the bottom 901c.

Further, the inner wall surface 901d covers a whole periphery of the bottom 901c. The bottom 901c, the inner wall surface 901d, and the outermost surface 901f in this embodiment are formed so as to partially depressing a metal plate. Incidentally, the inner wall surface 901d may only be required to connect the outermost surface 901f and the bottom 901c, and needs not to cover the whole periphery of the bottom 901c. However, from a viewpoint of suppressing scattering of a spark described later, the inner wall surface 901d may preferably cover the whole periphery of the bottom 901c.

Here, the inner wall surface 901d may desirably be that a distance between opposing portions of the inner wall surface 901d is made sufficiently longer than a width of entrance of the spring contact 911 into the contact portion 901a. In this embodiment, as shown in part (a) of FIG. 15 or the like, the bottom 901c is a rectangular surface, and the outer peripheral edge portion of the bottom 901c has four sides. For this reason, as shown in parts (b) and (c) of FIG. 15, the inner wall surface 901d has four surfaces 901d1, 901d2, 901d3, and 901d4. At this time, in the inner wall surface 901d, a distance between a side where the surface 901d1 connects with the outer peripheral edge portion of the bottom 901c and an opposite side where the surface 901d2 connects with the outer peripheral edge portion of the bottom 901c is a distance E1. Further, in the inner wall surface 901d, a distance between a side where the surface 901d3 connects with the outer peripheral edge portion of the bottom 901c and an opposite side where the surface 901d4 connects with the outer peripheral edge portion of the bottom 901c is a distance E2.

Further, when the spring contact 911 enters the contact portion 901a, a width of the spring contact 911 as viewed in part (b) of FIG. 15 is a width E3, and a width of the spring contact 911 as viewed in part (c) of FIG. 15 is a width E4. In this case, it is desirable that relationships of $E1>E3$ and $E2>E4$ are satisfied. By this, the spring contact 911 is capable of contacting the bottom 901c without contacting the inner wall surface 901d. Accordingly, an arrangement such that at a periphery of a contact point 901e (see FIG. 16) between the spring contact 911 and the bottom 901c, the inner wall surface 901d is present, and on an outer surface side of the spring contact 911, the outermost surface 901f is present is realized.

By this arrangement, as shown in FIG. 16, even if a flammable foreign matter is caught by the contact point 901e and a spark is generated by a tracking phenomenon, the inner wall surface 901d which is a metal member functions a flame spread preventing wall. That is, a scattering direction of the generated spark is restricted to within a restriction range K. Here, the restriction range K is defined as follows.

(Restriction Range K)

That is, as shown in FIG. 16, in a cross section perpendicular to the bottom 901c, an arbitrary point on a boundary between the inner wall surface 901d and the outermost surface 901f is a first point $\alpha1$, and a point at a position opposing the first point $\alpha1$ on the boundary between the inner wall surface 901d and the outermost surface 901f is a second point $\alpha2$. In this case, a line connecting a center of the bottom 901c and the first point $\alpha1$ is a first line $\beta1$, and a line connecting the center of the bottom 901c and the second point $\alpha2$ is a second line 2. In an example of the illustration of FIG. 16, at the center of the bottom 901c, the contact point 901e between the bottom 901c and the spring contact 911 exists. Further, a range from the first line $\beta1$ to the second line $\beta2$ is defined as the restriction range K in which the scattering of the spark is restricted. In this embodiment, this restriction range k is 120° or more. That is, an angle formed between the first line $\beta1$ and the second line 2 is 120° or more. The angle formed between the first line $\beta1$ and the second line $\beta2$ may preferably be 170° or less, more preferably be 160° or less, further preferably be 150° or less.

Thus, by setting the angle formed between the first line $\beta1$ and the second line $\beta2$, a depth of the bottom 901c from the outermost surface 901f and an interval of opposite boundaries each between the bottom 901c and the outermost surface 901f can be appropriately set. Here, when the depth of the bottom 901c from the outermost surface 901f is excessively deep, a dimension of the electrode plate 901 with respect to a depth direction becomes large, and leads the upsizing of the apparatus. Further, relative to this depth, when the interval of the opposite boundaries each between the bottom 901c and the outermost surface 901f is excessively short, there is a liability that the scattering of the spark cannot be sufficiently suppressed. For this reason, in this embodiment, the restriction range K is restricted as described above.

Further, in this embodiment, the bottom 901c is disposed substantially parallel to the gravitational direction G. For this reason, the scattered spark drops in the gravitational direction G, and thus is not readily deposited on the cleaning frame 20. Incidentally, the bottom 901c may also be not parallel to the gravitational direction G, and for example, the bottom 901c may be inclined with respect to the gravitational direction G so as to be directed downward.

In this embodiment, as described above, the scattering of the spark toward the cleaning frame 20 can be suppressed, and therefore, as the resin material of the cleaning frame 20, it is possible to select a material low in flame retardancy. In general, relative to the material low in flame retardancy, a resin material high in flame retardancy is high in resin weight and large in environmental load by adding an additive thereto. By restricting the diffusion of the spark and by selecting the material low in flame retardancy, it is possible to obtain a constitution good in safety and environmental property.

[Electrical Contact of Developing Unit of Process Cartridge]

Subsequently, electrical contacts of the developing unit 15 of the process cartridge B will be described using FIGS. 10, 11, 17, and 18. Parts (a) and (b) of FIG. 17 are schematic views showing electrical contacts of the apparatus main assembly A corresponding to the developing unit 15 of the process cartridge B. FIG. 18 is a side view showing positions of the electrical contacts of the developing unit 15 in a state in which the developing roller 16 of the process cartridge B is separated from the photosensitive drum 11.

As shown in FIGS. 10 and 11, the process cartridge B includes a developing contact (first electrical contact portion) 16*b*, a developing blade contact (second electrical contact portion) 18*a*, and a supplying roller contact (third electrical contact portion) 13*a* at an end portion on a side opposite from the developing coupling 155 with respect to the longitudinal direction thereof. The developing contact 16*b* is a contact for supplying electric power from the apparatus main assembly A to the developing roller 16 which is a power receiving member. The developing blade contact 18*a* is a contact for supplying the electric power to the developing blade 18 which is a power receiving member. The supplying roller contact 13*a* is a contact for supplying the electric power to the supplying roller 13 which is a power receiving member.

That is, the developing contact 16*b* is an electrical contact portion electrically connected to the developing roller 16 and for being supplied with the electric power, for being supplied to the developing roller 16, from the outside of the process cartridge B. The developing blade contact 18*a* is an electrical contact portion electrical by connected to the developing blade 18 and for being supplied with the electric power, for being supplied to the developing blade 18, from the outside of the process cartridge B. The supplying roller contact 13*a* is an electrical contact portion electrically connected to the supplying roller 13 and for being supplied with the electric power, for being supplied to the supplying roller 13, from the outside of the process cartridge B.

Here, the photosensitive drum 11 is constituted so as to be rotated about a first rotational axis 11*a*. The developing roller 16 is constituted so as to be rotated about a second rotational axis 16*a*. As shown in FIG. 10, as viewed in a direction of the first rotational axis 11*a*, a virtual line passing through the first rotational axis 11*a* and the second rotational axis 16*a* is a first virtual line L1. In this case, the developing contact 16*b* which is a first electrical contact surface, the developing blade contact 18*a* which is a second electrical contact surface, and the supplying roller contact 13*a* which is a third electrical contact surface are provided on a second virtual line L2 parallel to the first virtual line L1, and are arranged in a direction in which the second vertical line L2 extends. Further, of the developing contact 16*b*, the developing blade contact 18*a*, and the supplying roller contact 13*a*, the developing contact 16*b* is in a position closest to the developing roller 16. Further, in the direction in which the second virtual line L2 extends, from a side close to the developing roller 16, the developing contact 16*b*, the developing blade contact 18*a*, and the supplying roller contact 13*a* are arranged in a named order. Further, with respect to a direction perpendicular to the second virtual line L2, a length of each of the developing contact 16*b*, the developing blade contact 18*a*, and the supplying roller contact 13*a* is longer as the contact is in a position remoter from the developing roller 16 in the direction in which the second virtual line L2 extends. Incidentally, the order of arrangement of these three electrical contact surfaces may also be not the above-described order of the developing contact 16*b*, the developing blade contact 18*a*, and the supplying roller contact 13*a*.

In this embodiment, each of the contacts is disposed on a side upstream of the swing axis 8 with respect to the mounting direction D. Further, the order of the respective contacts is such that from a downstream side toward an upstream side of the mounting direction D, the developing contact 16*b*, the developing blade contact 18*a*, and the supplying roller contact 13*a* are arranged in a named order. The developing contact 16*b*, the developing blade contact 18*a*, and the supplying roller contact 13*a* are disposed so that their heights (lengths) H16*b*, H18*a*, and H13*a*, respectively, in a direction perpendicular to the mounting direction D satisfy a relationship of: H13*a*>H18*a*>H16*b*.

Further, also, as regards lengths of the developing contact 16*b*, the developing blade contact 18*a*, and the supplying roller contact 13*a* in a swing direction about the swing axis 8 (pin 6) which is a swing center of the developing unit 15, these lengths become longer as the associated contact is remoter from the swing axis 8. In FIG. 10, a virtual arc M1 about the swing axis 8, a virtual arc M2 about the swing axis 8, and a virtual arc M3 about the swing axis 8 pass through the developing contact 16*b*, the developing blade contact 18*a*, and the supplying roller contact 13*a*, respectively. Each of directions indicated by these virtual arcs is the swing direction of the developing unit 15 with the swing axis 8 (pin 6) as a swing center, and the length in this direction becomes longer as the associated contact is away from the swing axis 8. Incidentally, in this embodiment, when the developing unit 15 is viewed in the direction of the first rotational axis 11*a*, with respect to the direction in which the second virtual line L2 extends, the position of the swing axis 8 (pin 6) of the developing unit 15 is present between the second rotational axis 16*a* and the developing contact 16*b*.

The apparatus main assembly A includes, as shown in part (a) of FIG. 17, a main assembly(-side) developing contact 108*a*, a main assembly(-side) developing blade contact 108*b*, and a main assembly(-side) supplying roller contact 108*c* as contacts corresponding to the developing contact 16*b*, the developing blade contact 18*a*, and the supplying roller contact 13*a*, respectively. With respect to the mounting direction D, these contacts 108*a*, 108*b*, and 108*c* are disposed so as to become higher, in a direction perpendicular to the mounting direction D, toward the upstream side of the mounting direction D. That is, the main assembly developing contact 108*a*, the main assembly developing blade contact 108*b*, and the main assembly supplying roller contact 108*c* are disposed, so as to become higher in the named order.

As shown in part (b) of FIG. 17, the main assembly supplying roller contact 108*c* is urged so as to be projected toward the process cartridge B by an urging spring 108*d* urged toward the supplying roller contact 13*a*. During mounting of the process cartridge B, by a taper-shaped portion 108*c*2 of the main assembly supplying roller contact 108*c*, the process cartridge B is capable of being received. After the mounting of the process cartridge B is completed, a main assembly supplying roller contact end 108*cl* of the main assembly supplying roller contact 108*c* contacts the supplying roller contact 13*a*, so that electric power supply is carried out. The main assembly developing contact 108*a* and the main assembly developing blade contact 108*b* also have similar constitutions. That is, the main assembly developing contact 108*a* includes a taper-shaped portion 108*a*2 and a main assembly developing contact end 108*a*1. The main assembly developing blade contact 108*b* includes a taper-shaped portion 108*b*2 and a main assembly developing blade contact end 108*b*1.

When the main assembly contacts are disposed as described above, the ends of the main assembly contacts are disposed in the following manner. That is, as shown in FIG. 10, points where the respective contacts of the process cartridge B contact the ends (108*a*1, 108*b*1, 108*c*1) of the main assembly contacts are disposed so as to become high toward the upstream side of the mounting direction D.

As shown in FIG. 18, even in a state in which the developing roller 16 is separated from the photosensitive drum 11, each of the contacts is separated away from the swing center toward the upstream side of the mounting direction D, and therefore, a movement amount of each contact becomes large. As described above, the heights of the contacts in the direction perpendicular to the mounting direction D satisfy H13*a*>H18*a*>H16*b*, so that the ends (108*a*1, 108*b*1, 108*c*1) of the main assembly contacts are not detached from the contacts (16*b*, 18*a*, 13*a*) of the process cartridge B.

That is, also during the separation, the electric power can be supplied to each of the contacts.

Further, as shown in FIG. 18, a most upstream contact with respect to the mounting direction D is disposed so that a position thereof during contact between the photosensitive drum 11 and the developing roller 16 and a position thereof during separation between the photosensitive drum 11 and the developing roller 16 at least partially overlap with each other as viewed in an axial direction of the developing roller 16. By the above, energizing contacts can be stably obtained even during the separation without upsizing the process cartridge B. Further, in this embodiment, the order of arrangement of the contacts is the developing contact 16*b*, the developing blade contact 18*a*, and the supplying roller contact 13*a* from a downstream side of the mounting direction D, but may also be a different order.

Incidentally, in the above-described embodiment, the case where the electrode plate 901 which is the charging contact is the metal plate was described. However, the electrode plate 901 may also be made of an electroconductive resin, and even in this case, an effect similar to the above-described effect can be obtained.

Another Embodiment

Another embodiment will be described using FIG. 19. Incidentally, this (another) embodiment is different from the above-described embodiment in constitution of the electrode plate 902 which is the charging contact. Other constitutions and actions are similar to those in the above-described embodiment, and therefore, constituent elements in another embodiment similar to those in the above-described embodiment are omitted from illustration and description or briefly described by adding the same reference numerals or symbols thereto, and in the following, a difference from the above-described embodiment will be principally described.

A contact portion 902*a* of an electrode plate 902 in this (another) embodiment includes an inner wall surface 902*d* which is an electrical contact surface and an outermost surface 902*f* which is a second surface positioned on an outside of the cleaning frame 20 than the inner wall surface 902*d* with respect to the longitudinal direction of the process cartridge B. The inner wall surface 902*d* is constituted by a plurality of flat surfaces different in normal direction from each other. The plurality of flat surfaces connect an apex P remote from the outermost surface 902*f* with the outermost surface 901*f* with respect to the longitudinal direction of the process cartridge B. In the another embodiment, by the plurality of flat surfaces, a polygonal pyramid-shaped portion (excluding a bottom) is constituted. For this reason, it can also be said that the plurality of flat surfaces constitute side surfaces of the polygonal pyramid and connect the apex P with the outermost surface 901*f*. The outermost surface 902*f* is positioned outside the cleaning frame 20 than the apex P of the polygonal pyramid with respect to the longitudinal direction of the process cartridge B. Further, in the another embodiment, the inner wall surface 902*d* is constituted by four flat surfaces each having a triangular shape.

In such a shape, the spring contact 911 and the electrode plate 902 contact at a contact point 902*e* on the inner wall surface 902*d*. By this, in the case where a spark generated from the contact point 902*e* on the inner wall surface 902*d* is scattered, each of other surfaces of the inner wall surface 902*d* which are not the surface as a part of the inner wall surface 902*d* at which the spark is generated, is capable of restricting the scattering of the spark.

For example, as shown in FIG. 19, it is assumed that the contact point 902*e* exists on a surface 902*d*1 which is a part of the inner wall surface 902*d*, and that the spark is generated at this surface 902*d*1. Even in that case, the inner wall surface 902*d* has the above-described polygonal pyramid shape, and therefore, other surfaces 902*d*2, 902*d*3, and 902*d*4 of the inner wall surface 902*d* function as a flame preventing wall. By this, it is possible to suppress the scattering of the spark to the cleaning frame 20.

Further, in the another embodiment, a restriction range K is defined in the following manner. An arbitrary point on a boundary between the plurality of the flat surfaces and the outermost surface 902*f* is a first point, and on the boundary between the plurality of flat surfaces and the outermost surface 902*f*, a point at a position opposing the first point in a cross section passing through the apex P and the first point is a second point. In this case, a range between a first line connecting the apex P and the first point and a second line connecting the apex P and the second point is defined as the restriction range K. Further, an angle formed between the first line and the second line is 120° or more.

In other words, of the plurality of flat surfaces constituting the inner wall surface 902*d*, in the case where an arbitrary flat surface is a first flat surface and a flat surface at a position opposing the first flat surface is a second flat surface, a range from the first flat surface to the second flat surface is the restriction range K. In the another embodiment, this restriction range is 120° or more. That is, an angle formed between the first flat surface and the second flat surface is 120° or more. Specifically, an angle formed between the surface 902*d*1 and the surface 902*d*3 opposing the surface 902*d*1 is 120° or more, and an angle formed between the surface 902*d*2 and the surface 902*d*4 opposing the surface 902*d*2 is 120° or more. An upper limit of the restriction range K is similar to the upper limit in the above-described embodiment.

Incidentally, in the above-described embodiments, the inner wall surface 902*d* has the recessed shape which is the polygonal pyramid shape, but the inner wall surface 902*d* may also have a conical shape. Further, a cross-sectional shape of the inner wall surface 902*d* parallel to the outermost surface 902*f* may be, other than the polygonal shape and the circular shape, shapes such as an elliptical shape and a combination of an arc and a flat surface, and the like.

As described above, the electrode member on the cartridge side is constituted as in the above-described embodiments, so that it is possible to provide a cartridge high in freedom of selection of the material of the frame. In the following, a constitution of the wire spring which is the main assembly-side electrode member will be described.

Embodiment 1

[Main Assembly Contact Constitution Using Conventional Coil Spring]

A conventional constitution for comparison with an embodiment 1 will be described using parts (a) to (c) of FIG. 20. Part (a) of FIG. 20 is a front view showing an electrical contact portion of an apparatus main assembly using a conventional coil spring, part (b) of FIG. 20 is a sectional view taken along an i-i line of part (a) of FIG. 20, and part (c) of FIG. 20 is a schematic view for illustrating a rotation stopper. Parts (a) and (b) of FIG. 21 are sectional views each showing the electrical contact portion of the apparatus main assembly A using the conventional coil spring for comparison with the embodiment 1. Incidentally, the embodiment 1 is different from the above-described embodiments in constitution of main assembly(-side) contacts (main assembly (-side) developing contact, main assembly(-side) supplying roller contact). Other constitutions and actions are similar to those in the above-described embodiments, and therefore, constituent elements in the embodiment 1 similar to those in the above-described embodiments are omitted from illustration and description or briefly described by adding the same reference numerals or symbols thereto, and in the following, a difference from the above-described embodiments will be principally described.

In the case of the main assembly contacts as shown in FIG. 17 described in the above-described embodiments, part costs of the main assembly developing contact 108*a*, the main assembly developing blade contact 108*b*, the main assembly supplying roller contact 108*c*, and the urging spring 108*d* are high. For this reason, a wire spring constitution including a torsion coil shown in FIG. 20 is employed in some instances.

A wire spring 201 which is a contact member includes a torsion coil portion 201*b* which is a coil portion, a first arm portion 201*f* extending from the torsion coil portion 201*b*, and a second arm portion 201*j* extending from the torsion coil portion 201*b* toward a side opposite from the first arm portion 201*f*. The torsion coil portion 201*b* is on a side upstream of the first arm portion 201*f* with respect to the mounting direction. The first arm portion 201*f* includes, between the torsion coil portion 201*b* and a free end 201*p*, a first portion 201*g*, a projected portion 201*a* which is a contact portion, a second portion 201*h*, a fifth portion 201*i*, and a retainer 201*c* which is a third portion in a named order. The torsion coil portion 201*b* is mounted to a boss portion 204*a* which is a supporting portion of a main assembly guiding part 204.

The first portion 210*g* extends so as to approach the bottom 901*c* as the first portion 201*g* approaches from the torsion coil portion 201*b* toward the projected portion 201*a* in the mounting direction. The second portion 201*h* extends so as to be away from the bottom 901*c* as the second portion 201*h* extends from the projected portion 201*a* toward a direction in which the second portion 201*h* is away from the first portion 201*g* in the mounting direction. Each of the first portion 201*g* and the second portion 201*h* extends linearly. Of angles formed between the first portion 201*g* and the second portion 201*h*, a smaller angle is an obtuse angle.

The retainer 201*c* extends toward a second direction Dr2. Incidentally, the mounting direction of the process cartridge B is a first direction Dr1, a direction which is a direction of a center axis R0 of the torsion coil portion 201*b* and which crosses the mounting direction is the second direction Dr2, and a direction perpendicular to the mounting direction and a rotational axis direction is a third direction Dr3. The fifth portion 201*i* is provided between the second portion 201*h* and the retainer 201*c*. The fifth portion 201*i* extends toward an upstream side of the mounting direction.

Further, the main assembly guiding part 204 includes the rotation stopper 204*d* which is a restricting portion contacting the second arm portion 201*j* of the wire spring 201 so as to restrict rotation of the wire spring 201 when the projected portion 201*a* of the wire spring 201 receives a force in the third direction Dr3.

However, in the case of the wire spring 201, the projected portion 201*a* (contact point) of the wire spring 201 rotates about the torsion coil portion 201*b*. For this reason, there is a liability that the projected portion 201*a* of the wire spring 201 enters the hole portion 210 of the process cartridge B and is stuck in the hole portion 210 during insertion and extraction of the process cartridge B, and thus the wire spring 201 is broken. The hole portion 210 of the process cartridge B described herein refers to a hole portion which open at a side surface of the process cartridge B as shown in FIGS. 10 and 11.

In the conventional process cartridge B, a position of the hole portion was shifted or the like so that the wire spring 201 does not enter the hole portion 210 of the process cartridge B during the insertion and the extraction of the process cartridge B, but it would be considered that there is no room for the shift in position of the hole portion 210 with downsizing of the process cartridge B. For example, as shown in FIG. 10, when the process cartridge B is inserted in the mounting direction D or extracted in an opposite direction, a locus of the hole portion 210 of the process cartridge B and the end 108*a*1 of the main assembly contact overlap with each other. In order to avoid this, for example, it would be considered that the position of the hole portion 210 is shifted in a direction perpendicular to the mounting direction D. However, when the position of the hole portion 210 is moved to another position for downsizing the process cartridge B, such movement has the influence on another part, and therefore, a state in which the position of the hole portion 210 cannot be moved even in the direction perpendicular to the mounting direction D.

Parts (a) and (b) of FIG. 21 are schematic views each for illustrating the wire spring 201 and the hole portion 210 of the process cartridge B as viewed in the same cross-sectional direction as part (b) of FIG. 20. Part (a) of the FIG. 21 is the schematic view showing a state in which the wire spring 201 enters the hole portion 210 of the process cartridge B and is stuck in the hole portion 210, and part (b) of FIG. 21 is the schematic view showing a state in which countermeasures are taken so that the wire spring 201 does not enter the hole portion 210 of the process cartridge B.

FIG. 22 is a schematic view showing a state in which the wire spring 201 is inclined, and part (a) of FIG. 23 is a schematic view in which the wire spring 201 is viewed from an inside of the image forming apparatus 200. Part (b) of FIG. 23 is a sectional view taken along a j-j line of part of FIG. 23 before the wire spring 201 is inclined, and part (c) of FIG. 23 is a sectional view taken along the j-j line of part (a) of FIG. 23 after the wire spring 201 is inclined.

As the countermeasures to the entrance of the wire spring 201 into the hole portion 210, a bending angle θ1 of the wire spring 201 shown in part (a) of FIG. 21 is made large so as to become a bending angle θ2 shown in part (b) of FIG. 21

(θ2>θ1). By this, a wire spring length Ls becomes longer than a hole width Lc of the hole portion 210 of the process cartridge B (Ls>Lc), so that it becomes possible to prevent that the wire spring 201 enters the hole portion 210 of the process cartridge B and is stuck in the hole portion 210. Here, the wire spring length Ls is length, in the mounting direction D, from a bent portion 201*e* of the wire spring 201 to the contact portion 201*d* where the wire spring 201 contacts an edge portion 210*a* of the hole portion 210 (see FIG. 21).

However, correspondingly to an increase in bending angle of the wire spring 201, the wire spring 201 is upsized. When the wire spring 201 is upsized and is inclined in an arrow H direction as shown in FIG. 22, a rotation angle increases. Then, as shown from part (b) of FIG. 23 to part (c) of FIG. 23, the retainer 201*c* of the wire spring 201 is inclined, so that there is a liability that the wire spring 201 is slipped out of a slit-like hole portion 202 of the main assembly guiding part in an arrow I direction of part (c) of FIG. 23. For that reason, even when a user touches the wire spring 201 or the like and thus the wire spring 201 is inclined, there is a need to take countermeasures to disengagement of the wire spring 201 from the image forming apparatus 200.

[Main Assembly Contact Constitution]

Next, a constitution of a wire spring 208 which is a contact member contacting each of the contacts of the process cartridge B in the embodiment 1 will be described using FIGS. 24, 25, and 26. Part (a) of FIG. 24 is a schematic view showing a constitution of the wire spring 208 in the embodiment 1, and part (b) of FIG. 24 is a schematic view showing the constitution of the wire spring 208 as viewed from "DOWN" shown in part (a) of FIG. 24. Incidentally, in FIG. 24, the first direction Dr1, the second direction Dr2, the third direction Dr3, and the like are also shown. Parts (a) and (b) of FIG. 25 are schematic views for illustrating a contact state of the wire spring 208 to each of the contacts of the process cartridge B, in which part (a) of FIG. 25 is the schematic view of the wire spring 208 and the contacts of the process cartridge B as viewed from a side surface of the image forming apparatus 200, and part (b) of FIG. 25 is a perspective view of the wire spring 208 and the contacts of the process cartridge B.

As shown in FIG. 24, the wire spring 208 which is a contact member includes a torsion coil portion 208*b* which is a coil portion, a first arm portion 208*f* extending from the torsion coil portion 208*b*, and a second arm portion 208*j* extending from the torsion coil portion 208*b* toward a side opposite from the first arm portion 208*f*. The first arm portion 208*f* includes, between the torsion coil portion 208*b* and a free end 208*p*, a first portion 208*g*, a projected portion 208*a* which is a contact portion, a second portion 208*h*, a fifth portion 208*i*, a retainer 208*c* which is a third portion, and a fourth portion 208*k* is a named order.

The first portion 208*g* extends so as to approach the developing contact 16*b* (or the developing blade contact 18*a* or the supplying roller contact 13*a*) as the first portion 208*g* approaches from the torsion coil portion 208*b* toward the projected portion 208*a* in the mounting direction. The second portion 208*h* extends so as to be away from the developing contact 16*b* (or the developing blade contact 18*a* or the supplying roller contact 13*a*) as the second portion 208*h* extends from the projected portion 208*a* toward a direction in which the second portion 208*h* is away from the first portion 208*g* in the mounting direction. Of angles formed between the first portion 208*g* and the second portion 208*h*, a smaller angle is an obtuse angle. This angle is 120 degrees or more and 160 degrees or less. The retainer 208*c* extends linearly toward the second direction Dr2.

As shown in FIG. 25, a main assembly(-side) developing contact 208A which is a first contact member contacts the developing contact 16*b* of the process cartridge B. A main assembly(-side) supplying roller contact 208B which is a second contact member contacts the supplying roller contact 13*a*. A main assembly(-side) developing blade contact 208C which is a third contact member contacts the developing blade contact 18*a*.

FIG. 26 is a schematic view for illustrating the wire spring 208 in a state in which the process cartridge B is pulled out from the image forming apparatus 200. Part (a) of FIG. 27 is a schematic view in which the wire spring 208 is viewed from an inside of the image forming apparatus 200, part (b) of FIG. 27 is a sectional view taken along a k-k line of part (a) of FIG. 27, and part (c) of FIG. 27 is a sectional view taken along an 1-1 line of part (a) of FIG. 27. Incidentally, in part (a) of FIG. 27, a rectangular frame line 204*b*1 indicated by a broken line in a hole portion 204*b* is an opening portion corresponding to a position where the retainer 208*c* exists with respect to the first direction Dr1.

As shown in part (b) of FIG. 27, the torsion coil portion 208*b* of the wire spring 208 is mounted to the boss portion 204*a* which is a supporting portion of the main assembly guiding part 204. The main assembly guiding part 204 is a supporting member provided with the boss portion 204*a* supporting the torsion coil portion 208*b*. Incidentally, the main assembly guiding part 204 includes the rotation stopper 204*d* which is a restricting portion contacting the second arm portion 208*j* of the wire spring 208 so as to restrict rotation of the wire spring 208 when the projected portion 208*a* receives a force in the third direction Dr3 (see part (c) of FIG. 20).

The wire spring 208 forms the projected portion (contact portion) 208*a* which passes through the hole portion 204*b* of the main assembly guiding part 204 and which contacts each of the contacts of the process cartridge B. The hole portion 204*c* has a slit shape, for example. As shown in part (c) of FIG. 27, the wire spring 208 then passes through the hole portion 204*b* of the main assembly guiding part 204 again, so that the retainer 208*c* functioning as a rotation stopper and a retainer during rotation of an end of the wire spring 208 on an outside of an insertion and extraction area of the process cartridge B, and the fourth portion 208*k* (the retainer 208*c* and the fourth portion 208*k* are a wire spring end portion 208*n*) are formed. The wire spring end portion 208*n* includes a first bending portion 208*l* and a second bending portion 208*m* on the outside of the insertion and extraction area of the process cartridge B (see part (a) of FIG. 24). The wire spring end portion 208*n* has a shape, after being bent at the first bending portion 208*l* and the second bending portion 208*m*, having a width L2 wider than a width L1 of the hole portion 204*b* of the main assembly guiding part 204 (L2>L1). Incidentally, the wire spring 208 in the embodiment 1 includes the fourth portion 208*k* bent from the retainer 208*c*, and therefore, although a constitution in which the wire spring 208 is not readily disengaged from the hole portion 204*b*, the wire spring 208 becomes further hard to be disengaged from the hole portion 204*b* by satisfying the relationship of L2>L1.

Here, the width L2 is a length of the fourth portion 208*k* in the third direction Dr3 when the wire spring 208 is viewed in the second direction Dr2. Thus, the fourth portion 208*k* of the wire spring 208 extends toward the third direction Dr3 as viewed in the mounting direction.

The width L2 of the fourth portion 208*k* as viewed in the mounting direction is wider than the width L1 of the opening in the second direction Dr2 at a position where the retainer 208*c* with respect to the mounting direction when the main assembly guiding part 204 is viewed in a direction perpendicular thereto (see part (c) of FIG. 27).

Thus, the wire spring 208 in the embodiment 1 has a shape such that the wire spring 208 extends, toward the cartridge-side electrical contact, to the projected portion 208*a* and is bent at the projected portion 208*a*, and then extends in a direction away from the cartridge-side electrical contact. The wire spring 208 includes the wire spring end portion 208*n* for restricting rotation of the wire spring 208 when the wire spring 208 is rotated. For that reason, a constitution in which even when the wire spring 208 is rotated about the torsion coil portion 208*b*, the wire spring end portion 208*n* cannot be disengaged by being caused to pass through the hole portion 204*b* of the main assembly guiding part 204 is realized.

[Constitution in Case that Main Assembly Contact is Inclined]

Next, a constitution in which the wire spring 208 in the embodiment 1 is inclined will be described using FIGS. 28 and 29. FIG. 28 is a schematic view for illustrating a state in which the wire spring 208 in FIG. 26 is inclined, part (a) of FIG. 29 is a schematic view in which the wire spring 208 is viewed from the inside of the image forming apparatus 200, and part (b) of FIG. 29 is a sectional view taken along an m-m line of part (a) of FIG. 29. The main assembly guiding part 204 includes an opposite wall 204*c* which opposes a side surface of the process cartridge B provided with the developing contact 16*b* (or the developing blade contact 18*a* or the supplying roller contact 13*a*) and which is provided with the hole portion 204*b* which is an opening extending in the mounting direction. The wire spring 208 is disposed so that the projected portion 208*a* projects relative to the opposite wall 204*c* through the hole portion 204*b* in the third direction Dr3 toward a side where the developing contact 16*b* (or the developing blade contact 18*a* or the supplying roller contact 13*a*) exists and so that the retainer 208*c* and the fourth portion 208*k* exist on a side opposite from the side where the developing contact 16*b* (or the developing blade contact 18*a* or the supplying roller contact 13*a*) exists, with respect to the opposite wall 204*c*. Further, the main assembly guiding part 204 includes a rib 209 which is an engaging portion engaging with the retainer 208*c* so as to restrict movement of the first arm portion 208*f* in a direction in which the first arm portion 208*f* approaches the developing contact 16*b* (or the developing blade contact 18*a* or the supplying roller contact 13*a*) in the third direction Dr3.

In FIG. 28, a state in which the wire spring 208 is inclined in an arrow H direction is shown, and as shown in part (b) of FIG. 29, even when the wire spring 208 is inclined, the width L2 of the fourth portion 208*k* is wider than the width L1 of the hole portion 204*b* of the main assembly guiding part 204. A constitution in which even when the wire spring 208 is inclined within a deformable range, the fourth portion 208*k* cannot be disengaged through passing thereof through the hole portion 204*b* of the main assembly guiding part 204, by satisfying L1<L2 is employed. Further, by the rib 209 shown in part (b) of FIG. 29, the fourth portion 208*k* is caught by the rib 209, and therefore, a constitution in which the fourth portion 208*k* does not further readily approach the hole portion 204*b* of the main assembly guiding part 204 is realized.

By the above-described constitutions, the electric power can be supplied to each of the contacts of the process cartridge B by the wire spring 208, and it becomes possible to prevent that even when the wire spring 208 is inclined, the fourth portion 208*k* passes through the hole portion 204*b* of the main assembly guiding part 204 and is disengaged through the hole portion 204*b*. Further, by employing the constitution of the embodiment 1, the wire spring can be used as the main assembly contact, so that it becomes possible to reduce a cost of the main assembly contact.

As described above, according to the embodiment 1, even in the case where a force is applied to the wire spring, the wire spring can be made hard to be disengaged from the apparatus main assembly.

Embodiment 2

An embodiment 2 will be described using parts (a) and (b) of FIG. 30. Part (a) of FIG. 30 shows the case where a shape of the wire spring end portion is different on the same sectional view as part (b) of FIG. 29, and part (b) of FIG. 30 is a detailed perspective view of a wire spring end portion. In the embodiment 1, a constitution in which the wire spring end portion 208*n* was bent so that the wire spring end portion 208*n* had a roughly U-shape as shown in part (b) of FIG. 29 was described.

However, as shown in parts (a) and (b) of FIG. 30, a constitution in which a first bending portion 208*l* and a second bending portion 208*m* are provided in a direction in which the wire spring end portion 208*n* does not have the roughly U-shape and in which 208*n* is bent is employed, so that a constitution in which L1<L2 is satisfied may be realized.

That is, in the embodiment 1, the fourth portion 208*k* was bent so as to be parallel to a virtual plane defined by the fifth portion 208*i* and the retainer 208*c*, specifically, so as to fall within the virtual plane. In the embodiment 2, the fourth portion 208*k* is bent in a direction (for example, the third direction Dr3) crossing a virtual plane defined by the fifth portion 208*i* and the retainer 298*c*. By doing so, a constitution in which the wire spring end portion 208*n* cannot be disengaged from the main assembly guiding part 204 through passing thereof through the hole portion 204*b* of the main assembly guiding part 204 is realized.

As described above, according to the embodiment 2, even when a force is applied to the wire spring, the wire spring can be made hard to be disengaged from the apparatus main assembly.

Embodiment 3

An embodiment 3 will be described using parts (a) and (b) of FIG. 31. Part (a) of FIG. 31 shows the case where a shape of the wire spring end portion is different on the same sectional view as part (b) of FIG. 29, and part (b) of FIG. 31 is a detailed perspective view of a wire spring end portion 208*n*'. In the embodiment 1, a constitution in which the wire spring end portion 208*n* was bent so that the wire spring end portion 208*n* had a roughly U-shape as shown in part (b) of FIG. 29 was described.

However, as shown in parts (a) and (b) of FIG. 31, a retainer 208*c*' may have a shape such that the retainer 208*c*' extends curvedly. By employing a constitution in which the retainer 208*c*' extends in a substantially U-shape or a circular arc shape toward a free end 208*p*, a constitution in which L1<L2 is satisfied may be realized.

Incidentally, as shown in part (b) of FIG. 31, in the case where the wire spring 208 includes the substantially U-shaped retainer 208*c*', the width L2 is defined in the following manner. As shown in part (a) of FIG. 31, the width L2 includes the free end 208*p* and the fourth portion 208*k* as viewed in the second direction Dr2 and is a length from the free end 208*p* to a projected portion 208*c*'1 of the retainer 208*c*' in the third direction Dr3. By doing so, a constitution in which the wire spring end portion 208*n*' cannot be disengaged from the main assembly guiding part 204 through passing thereof through the hole portion 204*b* of the main assembly guiding part 204 is realized.

As described above, according to the embodiment 3, even when a force is applied to the wire spring, the wire spring can be made hard to be disengaged from the apparatus main assembly.

OTHER EMBODIMENTS

In the above-described embodiments, description was made by taking, as an example, the electrode plate constitution provided to the process cartridge B as the cartridge, but this is an example of the constitution of the present invention, and an effect thereof is not limited to the effect of such a process cartridge B. For example, an electroconductive contact portion provided to the developing unit 15 may be used. In this case, for example, at least one of the developing roller 16, the supplying roller 13, and the developing blade 18 corresponds to a process member.

Here, the cartridge refers to a cartridge (unit) which includes at least one of a developer, an image bearing member such as the photosensitive drum, and the process member, such as the charging member, actable on the photosensitive drum and which is detachably mountable to the apparatus main assembly of the image forming apparatus of the electrophotographic type. As a representative example of the cartridge, it is possible to cite a process cartridge using the photosensitive drum and the developing unit in combination, and a drum cartridge (the above-described cleaning unit) including the photosensitive drum, the charging roller, and the cleaning member. In addition, it is possible to cite a developing cartridge (the above-described developing unit), a toner cartridge for accommodating the toner, and the like. The present invention is applicable to these various cartridges.

Further, in the above-described embodiments, the image forming apparatus including the single photosensitive drum was described, but the present invention is not limited thereto. For example, the present invention is also applicable to a color image forming apparatus of a tandem type including a plurality of photosensitive drums.

Further, in the above-described embodiment, as the image forming apparatus, the laser printer was described as an example, but the image forming apparatus may also be an LED printer or the like. The image forming apparatus forms an image on a recording medium (for example, sheet materials such as plain paper, a synthetic resin sheet which is a substitute for the plain paper, thick paper, a sheet for an overhead projector, and so on). Accordingly, the image forming apparatus in the present invention includes a copying machine, a printer, a facsimile machine, a multi-function machine having a plurality of functions of these machines.

As described above, also in the above-described other embodiments, even in the case where a force is applied to the wire spring, the wire spring can be made hard to be disengaged from the apparatus main assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-084481 filed on May 23, 2023, which is hereby incorporated by reference herein in its entirety.

What is claimed is:

1. An image forming apparatus comprising:

a unit including an electrical contact surface and a power receiving member configured to receive supply of electric power via the electric contact surface; and a main assembly to which the unit is detachably mounted, the main assembly including a contact member configured to supply the electric power to the power receiving member in contact with the electrical contact surface of the unit, the contact member being a wire spring including a coil portion and an arm portion which extends from the coil portion and which has a free end, wherein the arm portion includes a first portion, a contact portion, a second portion, a third portion, and a fourth portion in a named order between the coil portion and the free end, wherein the main assembly includes a supporting member provided with a supporting portion for supporting the coil portion, wherein when a mounting and dismounting direction of the unit is a first direction, a direction which is a direction of a center axis of the coil portion and which crosses the first direction is a second direction, and a direction crossing the first direction and the second direction is a third direction, the first portion, the contact portion, and the second portion are arranged along the first direction, the contact portion is configured to contact the electrical contact surface, the first portion extends so as to approach the electrical contact surface as the first portion approaches the contact portion from the coil portion in the first direction, the second portion extends away from the electrical contact surface as the second portion extends from the contact portion in the first direction toward a direction away from the first portion, and the third portion extends toward the second direction, wherein the supporting member includes an opposite wall which opposes a side surface of the unit provided with the electrical contact surface and which is provided with an opening extending in the first direction, wherein the contact portion projects in the third direction through the opening toward a side where the electrical contact surface is present with respect to the opposite wall, wherein the contact member is provided so that the third portion and the fourth portion are present on a side opposite from the side where the electrical contact surface is present with respect to the opposite wall, and wherein the fourth portion of the contact member extends toward the third direction as viewed in the first direction.

2. The image forming apparatus according to claim 1, wherein a length of the fourth portion as viewed in the first direction is longer than a width of the opening in the second direction in a position where the third portion is present in the first direction as viewed in a direction perpendicular to the supporting member.

3. The image forming apparatus according to claim 1, wherein the third portion extends linearly.

4. The image forming apparatus according to claim 1, wherein the third portion extends curvedly.

5. The image forming apparatus according to claim 1, wherein the coil portion is on a side upstream of the arm portion with respect to a mounting direction of the first direction.

6. The image forming apparatus according to claim 1, wherein the arm portion includes a fifth portion between the second portion and the third portion, and wherein the fifth portion extends toward an upstream side of a mounting direction of the first direction.

7. The image forming apparatus according to claim 1, wherein each of the first portion and the second portion extends linearly, and wherein a smaller angle of angles formed between the first portion and the second portion is an obtuse angle.

8. The image forming apparatus according to claim 7, wherein the smaller angle is 120 degrees or more and 160 degrees or less.

9. The image forming apparatus according to claim 1, wherein the supporting member includes a restricting portion contacting the fourth portion of the wire spring so as to restrict rotation of the wire spring when the contact portion of the wire spring receives a force in the third direction.

10. The image forming apparatus according to claim 1, wherein the supporting member includes an engaging portion configured to engage with the third portion so as to restrict movement of the arm portion in a direction approaching the electrical contact surface in the third direction.

11. The image forming apparatus according to claim 1, wherein the power receiving member is a developing roller which carries toner.

12. The image forming apparatus according to claim 11, wherein when the electrical contact surface and the power receiving member are a first electrical contact surface and a first power receiving member, respectively, the unit includes a second electrical contact surface and a second power receiving member configured to receive the supply of the electric power via the second electrical contact surface, wherein when the contact member is a first contact member, the main assembly includes a second contact member configured to supply the electric power to the second power receiving member in contact with the second electrical contact surface, and wherein the second contact member has the same shape as the first contact member.

13. The image forming apparatus according to claim 12, wherein the unit includes a third electrical contact surface and a third power receiving member configured to receive the supply of the electric power via the third electrical contact surface, wherein the main assembly includes a third contact member configured to supply the electric power to the third power receiving member in contact with the second electrical contact surface, and wherein the third contact member has the same shape as the first contact member.

14. The image forming apparatus according to claim 13, wherein the first electrical contact surface, the second electrical contact surface, and the third electrical contact surface are arranged along the first direction.

15. The image forming apparatus according to claim 12, wherein when the opening of the opposite wall is a first opening, the opposite wall is provided with a second opening, wherein when the contact portion is a first contact portion, the second contact member includes a second contact portion projecting in the third direction through the second opening toward a side where the second electrical contact surface is present, so as to contact the second electrical contact surface, and wherein the second opening includes a portion which is in a position different from the first opening with respect to the second direction and which is in the same position as the first opening with respect to the first direction.

16. The image forming apparatus according to claim 12, wherein the second power receiving member is a developing blade configured to regulate a layer thickness of the toner on the developing roller.

17. The image forming apparatus according to claim 12, wherein the second power receiving member is a developing blade configured to regulate a layer thickness of the toner on the developing roller, and wherein the third power receiving member is a supplying roller configured to supply the toner to the developing roller.

* * * * *